US008897186B2

(12) United States Patent
Chitrapu et al.

(10) Patent No.: US 8,897,186 B2
(45) Date of Patent: *Nov. 25, 2014

(54) RLAN WIRELESS TELECOMMUNICATIONS WITH RADIO ACCESS NETWORK (RAN) GATEWAY AND METHODS

(71) Applicant: Signal Trust for Wireless Innovation, Wilmington, DE (US)

(72) Inventors: Prabhakar R. Chitrapu, Blue Bell, PA (US); Narayan Parappil Menon, Syosset, NY (US); Fatih M. Ozluturk, Port Washington, NY (US); Brian Gregory Kiernan, Downingtown, PA (US)

(73) Assignee: Signal Trust for Wireless Innovation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,792

(22) Filed: Apr. 29, 2013

(65) Prior Publication Data

US 2013/0235833 A1 Sep. 12, 2013

Related U.S. Application Data

(63) Continuation of application No. 10/329,033, filed on Dec. 23, 2002, now Pat. No. 8,432,893.

(60) Provisional application No. 60/367,949, filed on Mar. 26, 2002, provisional application No. 60/367,946, (Continued)

(51) Int. Cl.
*H04B 7/00* (2006.01)
*H04L 12/28* (2006.01)
(Continued)

(52) U.S. Cl.
CPC .............. *H04W 40/02* (2013.01); *H04W 92/14* (2013.01); *H04W 88/0058* (2013.01);
(Continued)

(58) Field of Classification Search
CPC ................ H04L 12/2858; H04L 12/2869
USPC ......... 370/328, 335, 338, 342, 401, 216–218, 370/221, 225, 229–231, 235, 236, 254, 255, 370/351–357, 359–360, 386, 389, 400, 419, 370/422, 902, 912, 913, 431, 433, 463; 455/426.2, 41.2, 422.1, 445, 432.1; 709/200, 238, 230, 227, 220
See application file for complete search history.

(56) References Cited

U.S. PATENT DOCUMENTS 5,745,858 A 4/1998 Sato et al.
5,875,180 A 2/1999 Wiedeman et al.
(Continued)

FOREIGN PATENT DOCUMENTS

CA 2 281 456 4/2000
CN 1303224 7/2001
(Continued)

OTHER PUBLICATIONS

3rd Generation Partnership Project, "Technical Specification Group Core Network; Packet Domain; Interworking Between the Public Land Mobile Network (PLMN) Supporting Packet Based Services and Packet Data Networks (PDN) (Release 1999)," 3GPP TS 29.061 v3.9.0 (Mar. 2002).

(Continued)

*Primary Examiner* — Omar Ghowrwal
(74) *Attorney, Agent, or Firm* — Volpe and Koenig, P.C.

(57) ABSTRACT

Methods and apparatus for communicating with the Internet via a gateway are disclosed. The gateway may be a Radio Access Network (RAN) gateway. The gateway may communicate data with at least one user equipment (UE). The gateway may route the data via one or more interfaces. The data may be routed by bypassing a core network.

14 Claims, 22 Drawing Sheets

Related U.S. Application Data filed on Mar. 26, 2002, provisional application No. 60/367,948, filed on Mar. 26, 2002, provisional application No. 60/367,975, filed on Mar. 26, 2002, provisional application No. 60/367,950, filed on Mar. 26, 2002, provisional application No. 60/367,945, filed on Mar. 26, 2002.

(51) Int. Cl.
*H04L 12/66* (2006.01)
*H04W 40/02* (2009.01)
*H04L 12/54* (2013.01)
*H04W 92/14* (2009.01)
*H04W 88/16* (2009.01)
*H04L 12/64* (2006.01)
*H04W 80/04* (2009.01)

(52) U.S. Cl.
CPC .......... H04W 88/16 (2013.01); *H04L 12/5692* (2013.01); *H04L 2012/6481* (2013.01); *H04L 12/66* (2013.01); *H04W 80/04* (2013.01); *Y10S 370/913* (2013.01)
USPC .......... 370/310; 370/392; 370/419; 370/463; 370/913

(56) References Cited

U.S. PATENT DOCUMENTS

| | | | |
|---|---|---|---|
| 5,956,331 A | 9/1999 | Rautiola et al. | |
| 5,987,010 A | 11/1999 | Schnizlein | |
| 6,047,177 A | 4/2000 | Wickman | |
| 6,101,176 A * | 8/2000 | Honkasalo et al. | 370/335 |
| 6,115,370 A | 9/2000 | Struhsaker et al. | |
| 6,374,112 B1 | 4/2002 | Widegren et al. | |
| 6,452,915 B1 | 9/2002 | Jorgenson | |
| 6,512,751 B1 | 1/2003 | Struhsaker et al. | |
| 6,553,219 B1 | 4/2003 | Vilander et al. | |
| 6,594,240 B1 | 7/2003 | Chuah et al. | |
| 6,845,100 B1 | 1/2005 | Rinne | |
| 6,879,574 B2 | 4/2005 | Naghian et al. | |
| 6,996,087 B2 | 2/2006 | Ejzak | |
| 7,062,264 B2 | 6/2006 | Ko et al. | |
| 7,092,727 B1 | 8/2006 | Li et al. | |
| 7,116,647 B2 | 10/2006 | Uebayashi et al. | |
| 7,120,148 B1 * | 10/2006 | Batz et al. | 370/392 |
| 7,756,107 B1 * | 7/2010 | Blair et al. | 370/352 |
| 8,432,893 B2 * | 4/2013 | Chitrapu et al. | 370/351 |
| 2001/0017850 A1 | 8/2001 | Kalliokulju et al. | |
| 2001/0026541 A1 | 10/2001 | You et al. | |
| 2001/0046224 A1 | 11/2001 | Ryu | |
| 2001/0055298 A1 | 12/2001 | Baker et al. | |
| 2002/0003789 A1 * | 1/2002 | Kim et al. | 370/338 |
| 2002/0023162 A1 | 2/2002 | Ahn et al. | |
| 2002/0080757 A1 | 6/2002 | Narvanen et al. | |
| 2002/0090940 A1 | 7/2002 | Chen et al. | |
| 2002/0128017 A1 | 9/2002 | Virtanen | |
| 2002/0145993 A1 | 10/2002 | Chowdhury et al. | |
| 2002/0174335 A1 | 11/2002 | Zhang et al. | |
| 2002/0191561 A1 | 12/2002 | Chen et al. | |
| 2002/0191575 A1 | 12/2002 | Kalavade et al. | |
| 2003/0021256 A1 | 1/2003 | Lee | |
| 2003/0058874 A1 | 3/2003 | Sahaya et al. | |
| 2003/0063593 A1 | 4/2003 | Koyanagi et al. | |
| 2003/0104816 A1 | 6/2003 | Duplessis et al. | |
| 2003/0125021 A1 | 7/2003 | Tell et al. | |
| 2003/0171112 A1 | 9/2003 | Lupper et al. | |
| 2003/0185177 A1 * | 10/2003 | Chitrapu et al. | 370/335 |
| 2003/0185189 A1 | 10/2003 | Chitrapu et al. | |
| 2003/0185190 A1 | 10/2003 | Chitrapu et al. | |
| 2003/0192053 A1 | 10/2003 | Sheppard et al. | |
| 2004/0010609 A1 | 1/2004 | Vilander et al. | |
| 2005/0232222 A1 | 10/2005 | McConnell et al. | |

FOREIGN PATENT DOCUMENTS

| | | |
|---|---|---|
| CN | 1423889 | 6/2003 |
| EP | 0963087 | 12/1999 |
| EP | 1011278 | 6/2000 |
| EP | 1092277 | 4/2001 |
| EP | 1098539 | 5/2001 |
| EP | 1199843 | 8/2001 |
| EP | 1126738 | 8/2002 |
| JP | 2000-060982 | 3/2000 |
| JP | 2001-345855 | 12/2001 |
| JP | 2002-64546 | 2/2002 |
| TW | 240358 | 2/1995 |
| TW | 361019 | 6/1999 |
| TW | 370757 | 9/1999 |
| TW | 480891 | 3/2002 |
| WO | 97/02665 | 1/1997 |
| WO | 98/16037 | 4/1998 |
| WO | 98/40986 | 9/1998 |
| WO | 99/16266 | 4/1999 |
| WO | 99/29049 | 6/1999 |
| WO | 99/52307 | 10/1999 |
| WO | 00/01083 | 1/2000 |
| WO | 00/21246 | 4/2000 |
| WO | 00/60823 | 10/2000 |
| WO | 00/60824 | 10/2000 |
| WO | 00/62484 | 10/2000 |
| WO | 00/76171 | 12/2000 |
| WO | 01/37497 | 5/2001 |
| WO | 01/47479 | 6/2001 |
| WO | 01/58189 | 8/2001 |
| WO | 01/60023 | 8/2001 |
| WO | 01/95128 | 12/2001 |
| WO | 02/11466 | 2/2002 |
| WO | 02/17561 | 2/2002 |
| WO | 02/17664 | 2/2002 |
| WO | 02/32165 | 8/2002 |
| WO | 02/089509 | 11/2002 |
| WO | 02/104047 | 12/2002 |
| WO | 03/015360 | 2/2003 |

OTHER PUBLICATIONS

3$^{rd}$ Generation Partnership Project, "Technical Specification Group Core Network; Packet Domain; Interworking Between the Public Land Mobile Network (PLMN) Supporting Packet Based Services and Packet Data Networks (PDN) (Release 1999)," 3GPP TS 29.061 v3.10.0 (Jun. 2002).

3$^{rd}$ Generation Partnership Project, "Technical Specification Group Core Network; Packet Domain; Interworking Between the Public Land Mobile Network (PLMN) Supporting Packet Based Services and Packet Data Networks (PDN) (Release 4)," 3GPP TS 29.061 v4.4.0 (Mar. 2002).

3$^{rd}$ Generation Partnership Project, "Technical Specification Group Core Network; Packet Domain; Interworking Between the Public Land Mobile Network (PLMN) Supporting Packet Based Services and Packet Data Networks (PDN) (Release 4)," 3GPP TS 29.061 v4.5.0 (Jun. 2002).

3$^{rd}$ Generation Partnership Project, "Technical Specification Group Core Network; Packet Domain; Interworking Between the Public Land Mobile Network (PLMN) Supporting Packet Based Services and Packet Data Networks (PDN) (Release 5)," 3GPP TS 29.061 v5.1.0 (Mar. 2002).

3$^{rd}$ Generation Partnership Project, "Technical Specification Group Core Network; Packet Domain; Interworking Between the Public Land Mobile Network (PLMN) Supporting Packet Based Services and Packet Data Networks (PDN) (Release 5)," 3GPP TS 29.061 v5.3.0 (Sep. 2002).

3$^{rd}$ Generation Partnership Project, "Technical Specification Group Core Network; Packet Domain; Interworking Between the Public Land Mobile Network (PLMN) Supporting Packet Based Services and Packet Data Networks (PDN) (Release 7)," 3GPP TS 29.061 v7.3.0 (Mar. 2007).

Han-ying et al., "The System of 3G," Posts & Telecom Press, pp. 302-303, 312-315, Aug. 2001.

(56) References Cited

OTHER PUBLICATIONS

Idoue, "Architecture of Next Generation Mobile Packet Network," Information Processing, vol. 40, No. 5, pp. 498-502 (May 15, 1999).

Mobile Wireless Internet Forum, "IP in the RAN as a Transport Option in 3$^{rd}$ Generation Mobile Systems," Technical Report MTR-006, Release V2.0.0 (Jun. 18, 2001).

Mobile Wireless Internet Forum, "OpenRAN Architecture in 3$^{rd}$ Generation Mobile Systems," Technical Report MTR-007, Release V1.0.0 (Sep. 4, 2001).

Onoe et al., Feature Story (1) on IMT-2000 Service, Birth of Trailblazer "FOMA in Mobile New Century," NTT DoCoMo Technical Journal, vol. 9, No. 2, pp. 19-26 (Jul. 1, 2001).

Yunoki et al., "IMT-2000 Network," FUJITSU, vol. 51, No. 1, pp. 8-12 (Jan. 10, 200).

Zhen-hui, "Architecture of WLAN Access Network Used in Mobile Environment," Zhonxing Telecom Technology, pp. 17-19, Feb. 17, 2003.

\* cited by examiner

RLAN WIRELESS TELECOMMUNICATIONS WITH RADIO ACCESS NETWORK (RAN) GATEWAY AND METHODS

CROSS REFERENCE TO RELATED APPLICATION(S)

This application is a continuation of U.S. patent application Ser. No. 10/329,033, filed Dec. 23, 2002, which has become U.S. Pat. No. 8,432,893 B2, issued on Apr. 30, 2013; which claims the benefit of U.S. Provisional Application No. 60/367,949, filed Mar. 26, 2002; U.S. Provisional Application No. 60/367,975, filed Mar. 26, 2002; U.S. Provisional Application No. 60/367,946, filed Mar. 26, 2002; U.S. Provisional Application No. 60/367,945, filed Mar. 26, 2002; U.S. Provisional Application No. 60/367,950, filed Mar. 26, 2002; and U.S. Provisional Application No. 60/367,948, filed Mar. 26, 2002. The contents of the above-identified applications are incorporated by reference herein.

FIELD OF INVENTION

The present invention relates to wireless telecommunications including a Radio Access Network (RAN) gateway, and connection and communication of the gateway with the Internet.

BACKGROUND

Wireless telecommunication systems are well known in the art. Wireless systems require an available bandwidth in which to operate. Typically, the permission to use a portion of the available spectrum for wireless communication for a particular geographic region is obtained from an appropriate governmental unit of the physical territory in which the wireless communications are to be conducted. In order to make efficient use of limited spectrum available for operation of a wireless telecommunication system, Code Division Multiple Access (CDMA) systems have been developed which include Time Division Duplex (TDD) modes which provide a very flexible framework for providing concurrent wireless communication services. Supported wireless communication services can be any of a variety of types including voice, fax, and a host of other data communication services.

In order to provide global connectivity for CDMA systems, standards have been developed and are being implemented. One current standard in widespread use is known as Global System for Mobile Telecommunications (GSM). This was followed by the so-called Second Generation mobile radio system standards (2G) and its revision (2.5G). Each one of these standards sought to improve upon the prior standard with additional features and enhancements. In January 1998, the European Telecommunications Standard Institute-Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIGS. 1 and 2. The UMTS network architecture includes a Core Network (CN) interconnected with a UMTS Terrestrial Radio Access Network (UTRAN) via an interface known as IU which is defined in detail in the current publicly available 3GPP specification documents.

The UTRAN is configured to provide wireless telecommunication services to users through User Equipments (UEs) via a radio interface known as UU. The UTRAN has base stations, known as Node Bs in 3GPP, which collectively provide for the geographic coverage for wireless communications with UEs. In the UTRAN, groups of one or more Node Bs are connected to a Radio Network Controller (RNC) via an interface known as Iub in 3GPP. The UTRAN may have several groups of Node Bs connected to different RNCs, two are shown in the example depicted in FIG. 1. Where more than one RNC is provided in a UTRAN, inter-RNC communication is performed via an Iur interface.

A UE will generally have a Home UMTS Network (HN) with which it is registered and through which billing and other functions are processed. By standardizing the Uu interface, UEs are able to communicate via different UMTS networks that, for example, serve different geographic areas. In such case the other network is generally referred to as a Foreign Network (FN).

Under current 3GPP specifications, the Core Network of a UE's HN serves to coordinate and process the functions of Authentication, Authorization and Accounting (AAA functions). When a UE travels beyond its Home UMTS Network, the HN's Core Network facilitates the UE's use of a Foreign Network by being able to coordinate the AAA functions so that the FN will permit the UE to conduct communications. To assist in implementing this activity, the Core Network includes a Home Location Register (HLR) which tracks the UEs for which it is the HN and a Visitor Location Register (VLR). A Home Service Server (HSS) is provided in conjunction with the HLR to process the AAA functions.

Under current 3GPP specifications, the Core Network, but not the UTRAN, is configured with connectivity to external systems such as Public Land Mobile Networks (PLMN), Public Switch Telephone Networks (PSTN), Integrated Services Digital Network (ISDN) and other Real Time (RT) services via an RT service interface. A Core Network will also support Non-Real Time services with the Internet. External connectivity of the Core Network to other systems, enables users using UEs to communicate via their Home UMTS Network, beyond the area served by the HN's UTRAN. Visiting UEs can likewise communicate via a visited UMTS Network, beyond the area served by the visited UMTS's UTRAN.

Under current 3GPP specifications, the Core Network provides RT service external connectivity via a Gateway Mobile Switching Center (GMSC). The Core Network provides NRT service, known as General Packet Radio Service (GPRS), external connectivity via a Gateway GPRS Support Node (GGSN). In this context, a particular NRT service may actually appear to a user to be a real time communication due to the communication speed and associated buffering of the TDD data packets forming the communication. One example of this is voice communication via the Internet which can appear to the user as a normal telephone call conducted by a switching network, but is actually being conducted using an Internet Protocol (IP) connection which provides Packet data Service.

A standard interface known as GI is generally used between a CN's GGSN and the Internet. The GI interface can be used with Mobile Internet Protocols, such as Mobile IP v4 or Mobile IP v6 as specified by the Internet Engineering Task Force (IETF).

Under current 3GPP specifications, to provide support for both RT and NRT services from external sources for radio linked UEs in a 3GPP system, the UTRAN must properly interface with the CN which is the function of the Iu interface. To do this, the Core Network includes a Mobile Switching Centre (MSC) that is coupled to the GMSC and a Serving GPRS Support Node (SGSN) that is coupled to the GGSN. Both are coupled with the HRL and the MSC is usually combined with the Visitor Location Register (VLR).

The Iu interface is divided between an interface for Circuit Switched communications (Iu-CS) and an interface for packet data via Packet Switched communications (Iu-PS). The MSC is connected to the RNCs of the UTRAN via the Iu-CS interface. The Serving GPRS Support Node (SGSN) is coupled to the UTRAN's RNCs via the Iu-PS interface for Packet Data Services.

The HLR/HSS is typically interfaced with the CS side of the Core Network, MSC and GMSC via an interface known as Gr which supports AAA functions through a Mobile Application Part (MAP) Protocol. The SGSN and the GGSN of the CN are connected using interfaces known as Gn and Gp.

Common to 3GPP systems and other systems which utilize TDD-CDMA telecommunications, such as some GSM systems, is the aforementioned division of connectivity between the radio network and the Core Network. In general, the radio network, i.e. the UTRAN in 3GPP, communicates via a wireless interface with UEs and the Core Network communicates with external systems via RT and NRT service connections. Applicants have recognized this standardized type of architecture is most likely the result of the processing of the AAA functions in the Core Network. However, applicants have further recognized that even if the AAA functions are to be maintained in the Core Network, significant advantages and benefits can be obtained by providing direct connectivity from a TDD-CDMA radio network to the Internet.

In particular, Applicants have recognized that the existing separation of functions of the Iu interface defined in 3GPP for Circuit Switched (CS) communications used with Real Time services (Iu-CS interface) and defined in 3GPP for Packet Switch (PS) service used with Non-Real Time services (Iu-PS interface), enables one to easily provide an IP Gateway in the UTRAN for enabling the UTRAN to direct connectivity to the Internet bypassing use of a Core Network for this function. Moreover, as a result, Applicants have recognized that by permitting direct access to the Internet from the UTRAN, a Radio Local Area Network is defined that can provide significant benefits and advantages for use with or without a Core Network.

Further detail of a typical 3GPP system is illustrated in FIG. 3. The UTRAN segment of a conventional UMTS architecture is split it into two traffic planes known as the C- and U-planes. The C-plane carries control (signaling) traffic, and the U-plane transports user data. The over-the-air segment of the UTRAN involves two interfaces: the Uu interface between UE and Node B, and the Iub interface between the Node B and RNC. As noted above, the back-end interface between the RNC and core network is referred to as the Iu interface, split into the Iu-CS for the circuit-switched connection into the MSC, and the Iu-PS for the packet-switched connection into the SGSN.

The most significant signaling protocol on the over-the-air segment of the UTRAN is Radio Resource Control (RRC). RRC manages the allocation of connections, radio bearers and physical resources over the air interface. In 3GPP, RRC signaling is carried over the Radio Link Control (RLC) and Medium Access Control (MAC) UMTS protocols between the UE and RNC. Overall, the RNC is responsible for the allocation/de-allocation of radio resources, and for the management of key procedures such as connection management, paging and handover. Over the Iub interface, RRC/RLC/MAC messaging is typically carried on a Transport Layer via Asynchronous Transfer Mode (ATM), using the ATM Adaptation Layer Type 5 (AAL5) protocol over the ATM physical layer with intermediary protocols, such as Service Specific Coordination Function (SSCF) and the Service Specific Connection Oriented Protocol SSCOP, being used above AAL5.

U-plane data (e.g. speech, packet data, circuit-switched data) uses the RLC/MAC layers for reliable transfer over the air interface (between UE and RNC). Over the Iub segment, this data flow (user data/RLC/MAC) occurs over UMTS-specified frame protocols using the ATM Adaptation Layer Type 2 (AAL2) protocol over the ATM physical layer running (AAL2/ATM).

The Iu interface carries the Radio Access Network Application Part (RANAP) protocol. RANAP triggers various radio resource management and mobility procedures to occur over the UTRAN, and is also responsible for managing the establishment/release of terrestrial bearer connections between the RNC and SGSN/MSC. RANAP is carried over AAL5/ATM, with intermediary Signaling System 7 (SS7) protocols, such as Signaling Connection Control Part, Message Transfer Part (SCCP/MTP) on top of SSCF and the Service Specific Connection Oriented Protocol (SSCOP), being used above AAL5. Internet Protocol is typically used over AAL5/ATM for the Iu-PS interface so that the intermediate Stream Control Transmission Protocol (SCTP) is then used over IP. Where multiple RNCs exist in a UTRAN which have an Iur interface, IP is also commonly used over ATM and intermediate protocols include SSCP, SCTP and the Message Transfer Part level 3 SCCP adaptation layer of SS7 (M3UA) that have been developed by IETF.

For the U-Plane, between the UTRAN and the CN, circuit-switched voice/data traffic typically flows over AAL5/ATM, via the Iu-CS interface, between the RNC and MSC. Packet-switched data is carried over the Iu-PS interface between the RNC and SGSN, using the GPRS Tunneling Protocol (GTP) running over the User Data Protocol for the Internet Protocol (UDP/IP) over AAL5/ATM.

Applicants have recognized that this architecture can be improved upon in connection with providing direct IP connectivity for the UTRAN.

SUMMARY

The present invention provides for a Time Division Duplex-Radio Local Area Network (TDD-RLAN) which includes a Radio Access Network Internet Protocol (RAN IP) gateway that enables connectivity to the public Internet. The system may serve as a stand-alone system or be incorporated into a UMTS used with conventional Core Network, particularly for tracking and implementing AAA functions in the Core Network.

The RLAN provides concurrent wireless telecommunication services for a plurality of user equipments (UEs) between UEs and/or the Internet. The RLAN includes at least one base station that has a transceiver for conducting time division duplex (TDD) code division multiple access (CDMA) wireless communications with UEs in a selected geographic region. The RLAN also has at least one controller that is coupled with a group of base stations, which includes the base station. The controller controls the communications of the group of base stations. A novel Radio Access Network Internet Protocol (RAN IP) Gateway (RIP GW) is coupled with the controller. The RAN IP Gateway has a Gateway General Packet Radio Service (GPRS) Support Node (GGSN) with access router functions for connection with the Internet.

The RLAN can include a plurality of base stations, each having a transceiver configured with a Uu interface for conducting time division duplex (TDD) wideband code division multiple access (W-CDMA) wireless communications with UEs in a selected geographic region. The RLAN can also include a plurality of controllers that are each coupled with a group of base stations.

Preferably, the RAN IP Gateway has a Serving GPRS Support Node (SGSN) that is coupled with one or more controllers in the RLAN. Preferably, the controllers are Radio Network Controller (RNCs) in accordance with 3GPP specification. Preferably, the RNCs are coupled with the base stations using a stacked, layered protocol connection having a lower transport layer configured to use Internet Protocol (IP). Where the RLAN has multiple RNCs, the RNCs are preferably coupled to each other using a stacked, layered protocol connection having a lower transport layer configured to use Internet Protocol (IP)

Methods of mobility management using a radio local area network (RLAN) are disclosed for providing concurrent wireless telecommunication services for a plurality of UEs where an associated core network (CN) supports Authentication, Authorization and Accounting (AAA) functions of UEs. A RLAN conducts TDD-CDMA wireless communications with UEs in a RLAN service region. The RLAN has a RAN IP Gateway that has a GPRS connection with the Internet and is configured to communicate AAA function information to the associated CN.

In one method, a wireless connection is established between a first UE within the RLAN service region and a second UE outside of the RLAN service region for conducting a communication of user data. AAA functions for said communication between said first and second UEs are conducted using the Core Network. The GPRS connection with the Internet is used for transporting user data of the communication between the first and second UEs. The method may include continuing the wireless communication between the first and second UEs as the second UE moves from outside to within the RLAN service region, where use of the GPRS connection with the Internet for transporting user data is discontinued. The method can further include continuing the wireless communication between the first and second UEs as either the first or second UE moves from within to outside the RLAN service region by resuming use of the GPRS connection with the Internet for transporting user data.

In another method, a wireless connection is established between first and second UEs within the RLAN service region for conducting a communication of user data. AAA functions for the communication between the first and second UEs are conducted using the Core Network. The wireless communication between the first and second UEs is continued as either the first or second UE moves from within to outside the RLAN service region by using the GPRS connection with the Internet for transporting user data of the continued communication.

A further method of mobility management is provided where the associated CN supports AAA functions of home UEs and the GPRS connection of the RAN IP Gateway is configured to tunnel AAA function information through the Internet to the Core Network. A wireless connection is established between a home UE and a second UE for conducting a communication of user data. AAA functions for the communication are conducted using the Core Network by using the GPRS connection with the Internet to tunnel AAA function information through the Internet to the Core Network.

This method may be used where the wireless connection is established when either the home UE or the second UE is within or outside the RLAN service region. Where one is within and the other is outside of the RLAN service region, the GPRS connection with the Internet is used for transporting user data of the communication between the home and second UEs.

This method may further include continuing the wireless communication between the home and second UEs as one moves such that both are outside or both are within the RLAN service region, where the use of said General Packet Radio Service (GPRS) connection with the Internet for transporting user data is discontinued. The method may further include continuing the wireless communication between the home and second UEs as either the home or second UE moves so that one is within and the other is outside the RLAN service region by using the GPRS connection with the Internet for transporting user data for the continued communication.

In one aspect of the invention, the RLAN has as control means one or more U-Plane and C-Plane Servers coupled with base stations. The U-Plane Server(s) are configured to control user data flow of base station communications. The C-Plane Server(s) are configured to control signaling for base stations communication. Preferably, the RAN IP Gateway has a SGSN that is coupled with the U-plane Servers and at least one C-Plane Server. Preferably, the U-Plane Servers and C-Plane Servers are coupled with each other, the base stations, and the RAN IP Gateway using stacked, layered protocol connections having a lower transport layer configured to use Internet Protocol (IP).

Optionally, a Voice Gateway having a Pulse Code Modulation (PCM) port for external connection may be provided for the RLAN. The Voice Gateway is preferably coupled with a U-plane and a C-Plane Server (or an RNC where RNCs are used) using stacked, layered protocol connections having a lower transport layer configured to use Internet Protocol (IP).

In another aspect of the invention, the RLAN has one or more Radio Network Controllers (RNCs) coupled with base stations and a RAN IP Gateway to which at least one RNC is coupled via an Iu-PS interface using a stacked, layered protocol connection having a lower transport layer configured to use Internet Protocol (IP). Preferably, the RNCs are coupled the base stations and each other using stacked, layered protocol connections having a lower transport layer configured to use Internet Protocol (IP). Preferably, each base station has a transceiver configured with a Uu interface for conducting time division duplex (TDD) wideband code division multiple access (W-CDMA) wireless communications with UEs in a selected geographic region and the RAN IP Gateway has a SGSN that is coupled with the RNCs.

In another aspect of the invention, the RLAN supports voice communications over IP and has a RAN IP Gateway having a GGSN for connection with the Internet that passes compressed voice data. The RLAN is preferably connected to the Internet via an internet service provider (ISP) that has a voice gateway that converts compressed voice data and Pulse Code Modulation (PCM) signaling using a known compression protocol, which may or may not be the type of voice compression data used by UEs conducting wireless communications with the RLAN.

Where the UEs use one compression protocol and the RLAN is connected with the Internet via an ISP having a voice gateway that converts compressed voice data and PCM signaling using a different compression protocol, the RLAN includes a voice data converter for converting between compressed voice data of the two different compression protocols. Preferably, the RAN IP Gateway includes the voice data converter which is, for example, configured to covert between AMR compressed voice data and G.729 compressed voice data. The RLAN may be configured with U-Plane and C-Plane Servers or RNCs, but preferably all component interfaces within the RLAN use stacked, layered protocol connections having a lower transport layer configured to use Internet Protocol (IP).

The invention further provides a telecommunication network having one or more radio network for providing concurrent wireless telecommunication services for a plurality of UEs and an associated CN for supporting AAA functions of UEs for which the telecommunication network is a Home Network. One or more of the radio networks is a RLAN having a RAN IP Gateway that has a GGSN configured with a GI interface for connection with the Internet and is configured to communicate AAA function information to the CN. Preferably, the RLANs each have one or more base stations that have a transceiver for conducting TDD-CDMA wireless communications with UEs in a selected geographic region. Preferably, the RLANs have controllers coupled with the base stations. Preferably, the RLANs' RAN IP Gateways have a SGSN that is coupled with the respective controllers.

The RLAN may be configured without a direct CN connection where the RAN IP Gateway is configured for communication of AAA function information with the CN by tunneling data through an Internet connection. Alternatively, the RAN IP Gateway has a coupling with the CN for communication of AAA function information with the CN via a limited connection, such as a Radius/Diameter or MAP supporting connection or a conventional Iu-CS interface, or a full conventional Iu interface.

Preferably, the RAN IP Gateways have GGSNs configured for connection with the Internet via a GI interface. For mobile support, the GI interface is preferably configured with Mobile IP v4 or Mobile IP v6.

Other objects and advantages of the present invention will be apparent to those skilled in the art from the following detailed description and the drawings.

BRIEF DESCRIPTION OF THE DRAWING(S)

TABLE OF ACRONYMS

| | |
|---|---|
| 2G | Second Generation |
| 2.5G | Second Generation Revision |
| 3GPP | Third Generation Partnership Project |
| AAA functions | Authentication, Authorization and Accounting functions |
| AAL2 | ATM Adaptation Layer Type 2 |
| AAL5 | ATM Adaptation Layer Type 5 |
| AMR | A type of voice data compression |
| ATM | Asynchronous Transfer Mode |
| CDMA | Code Division Multiple Access |
| CN | Core Network |
| CODECs | Coder/Decoders |
| C-RNSs | Control Radio Network Subsystems |
| CS | Circuit Switched |
| ETSI | European Telecommunications Standard Institute |
| ETSI SMG | ETSI - Special Mobile Group |
| FA | Forwarding Address |
| FN | Foreign Network |
| G.729 | A type of voice data compression |
| GGSN | Gateway GPRS Support Node |
| GMM | GPRS Mobility Management |
| GMSC | Gateway Mobile Switching Center |
| GPRS | General Packet Radio Service |
| GSM | Global System for Mobile Telecommunications |
| GTP | GPRS Tunneling Protocol |
| GW | Gateway |
| H.323/SIP | H.323 Format for a Session Initiated Protocol |
| HLR | Home Location Register |
| HN | Home Network |
| HSS | Home Service Server |
| IP | Internet Protocol |
| ISDN | Integrated Services Digital Network |
| ISP | Internet Service Provider |
| Iu-CS | Iu sub Interface for Circuit Switched service |
| Iu-PS | Iu sub Interface for Packet Switched service |

-continued

TABLE OF ACRONYMS

| | |
|---|---|
| IWU | Inter Working Unit |
| M3UA | Message Transfer Part Level 3 SCCP SS7 Adaptation Layer |
| MAC | Medium Access Control |
| MAP | Mobile Application Part |
| MSC | Mobile Switching Centre |
| NRT | Non-Real Time |
| PCM | Pulse Code Modulation |
| PLMN | Public Land Mobile Network |
| PS | Packet Switched |
| PSTN | Public Switch Telephone Network |
| RANAP | Radio Access Network Application Part |
| RAN IP | Radio Access Network Internet Protocol |
| RIP GW | RAN IP Gateway |
| RLAN | Radio Local Area Network |
| RLC | Radio Link Control |
| RNC | Radio Network Controller |
| RRC | Radio Resource Control |
| RT | Real Time |
| SCCP/MTP | Signaling Connection Control Part, Message Transfer Part |
| SGSN | Serving GPRS Support Node |
| SCTP | Stream Control Transmission Protocol |
| SM | Session Management |
| SMS | Short Message Service |
| S-RNS | Serving Radio Network Subsystems |
| SS7 | Signaling System 7 |
| SSCF | Service Specific Coordination Function |
| SSCOP | Service Specific Connection Oriented Protocol |
| TDD | Time Division Duplex |
| UDP/IP | User Data Protocol for the Internet Protocol |
| UE | User Equipment |
| UMTS | Universal Mobile Telecommunications System |
| UTRAN | UMTS Terrestrial Radio Access Network |
| VLR | Visitor Location Register |

DETAILED DESCRIPTION OF THE PREFERRED EMBODIMENT(S)

Figure 1:
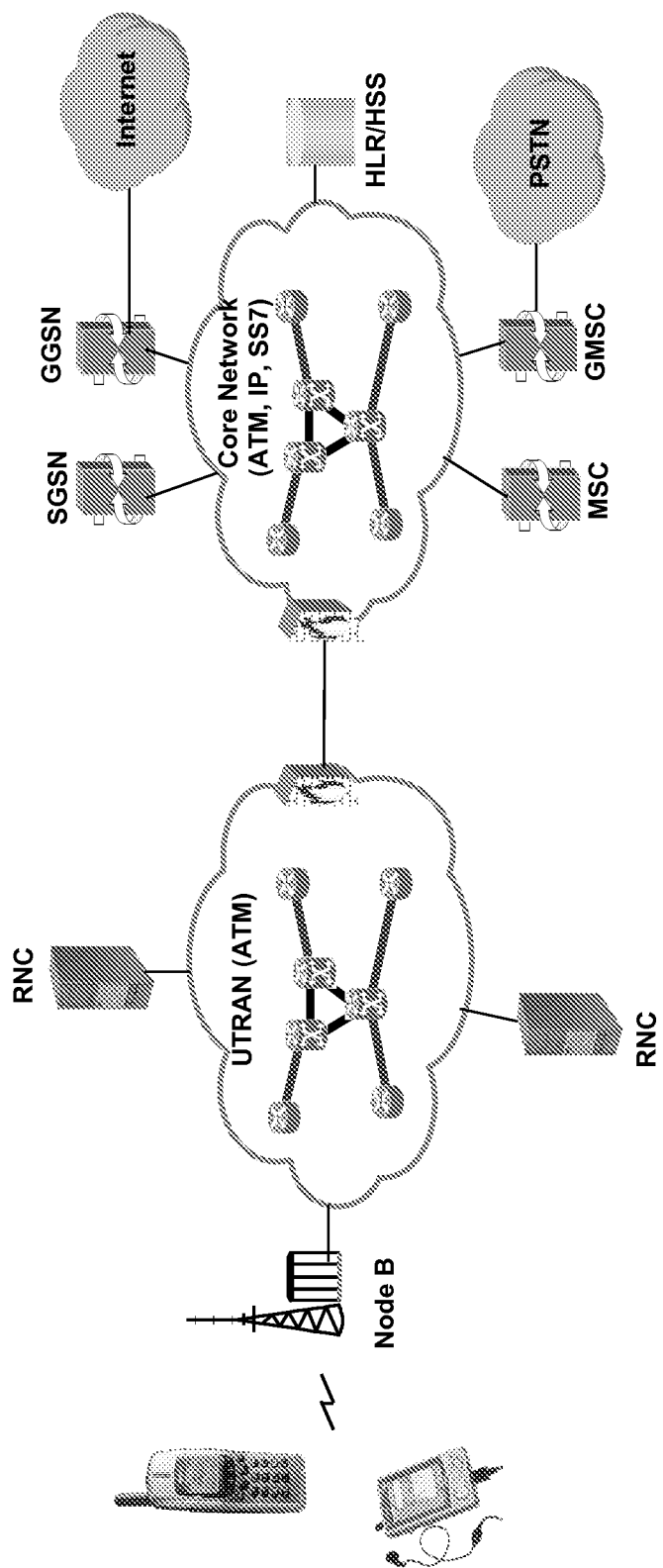
FIG. 1 is a graphic illustration of a conventional UMTS network in accordance with current 3GPP specification.
Figure 2:
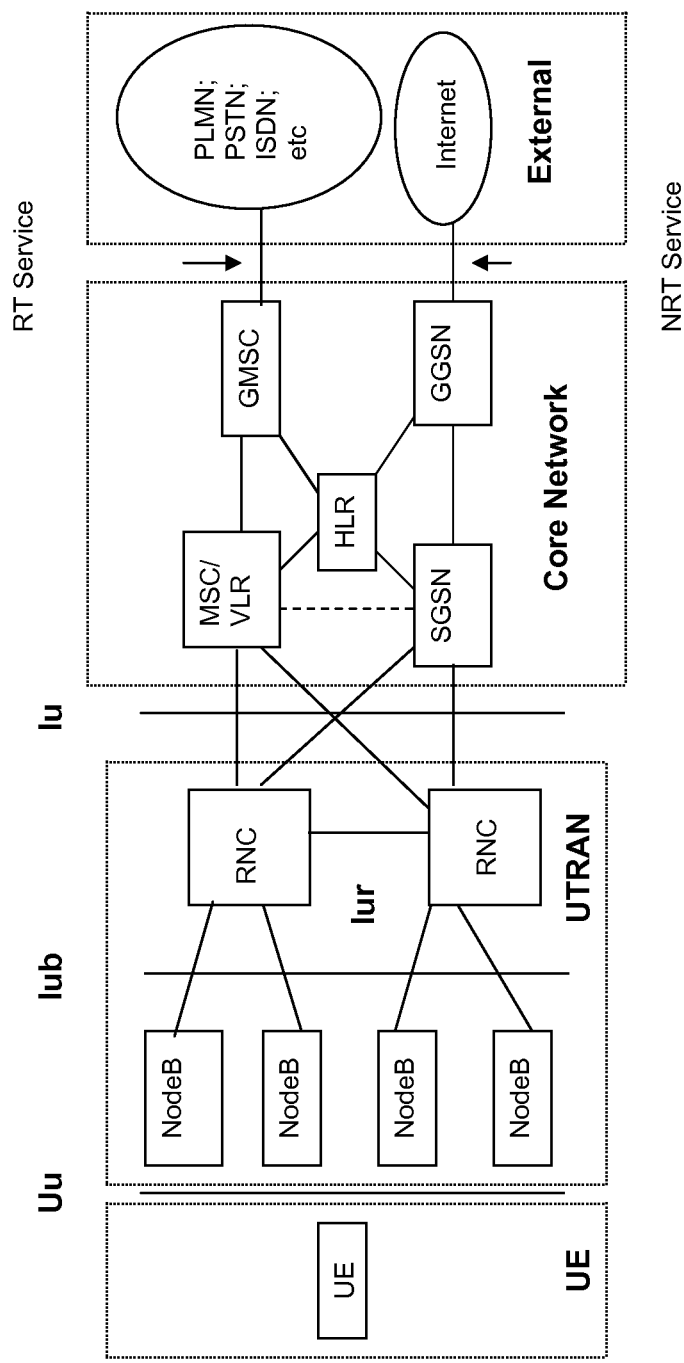
FIG. 2 is a block diagram showing various components and interfaces of the network illustrated in FIG. 1.
Figure 3:
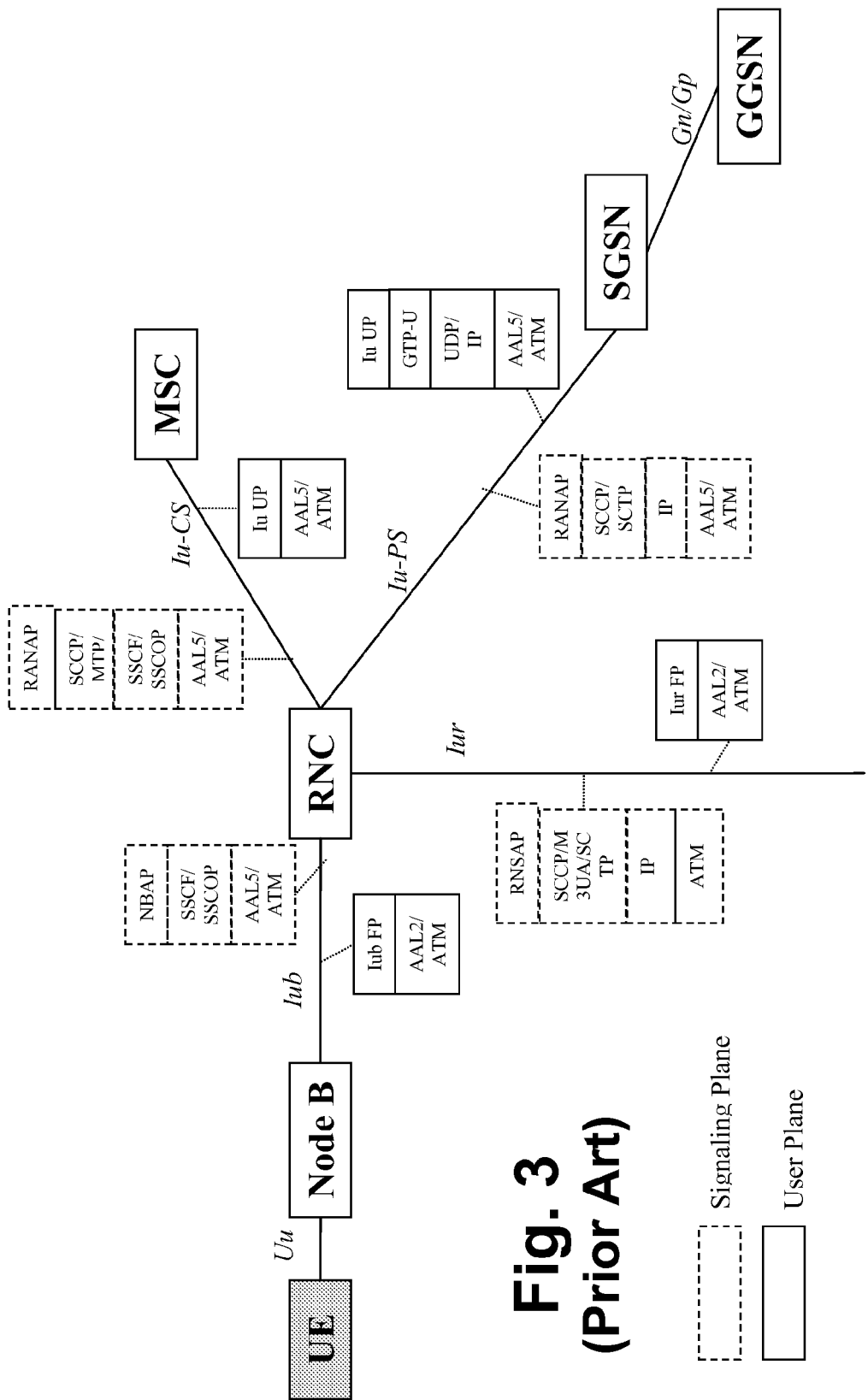
FIG. 3 is a schematic diagram of the conventional network illustrated in FIGS. 1 and 2 indicating layered stacked protocols of the various component interfaces in both signaling and user data planes.
Figure 4:
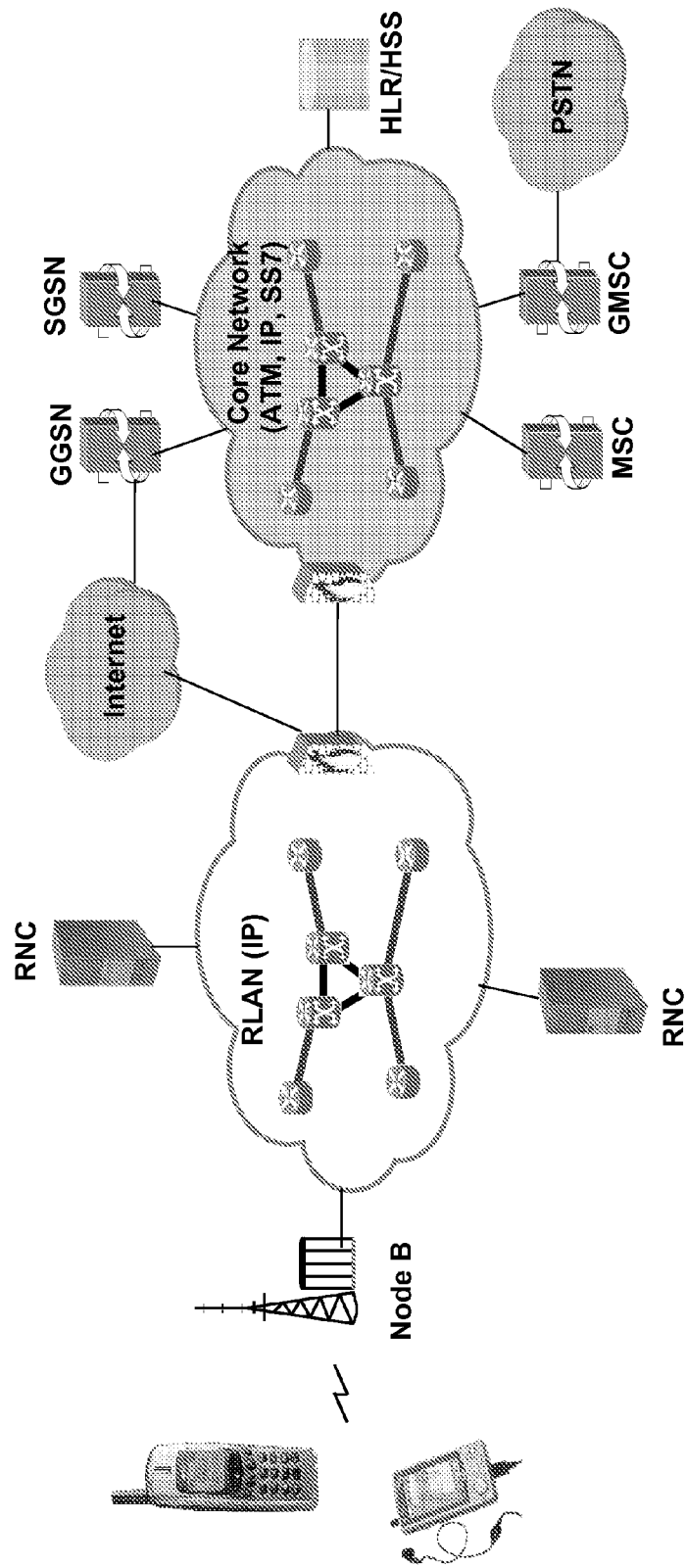
FIG. 4 is a graphic illustration of a UMTS network including a RLAN with a direct Internet link in accordance with the teachings of the present invention.
Figure 5:
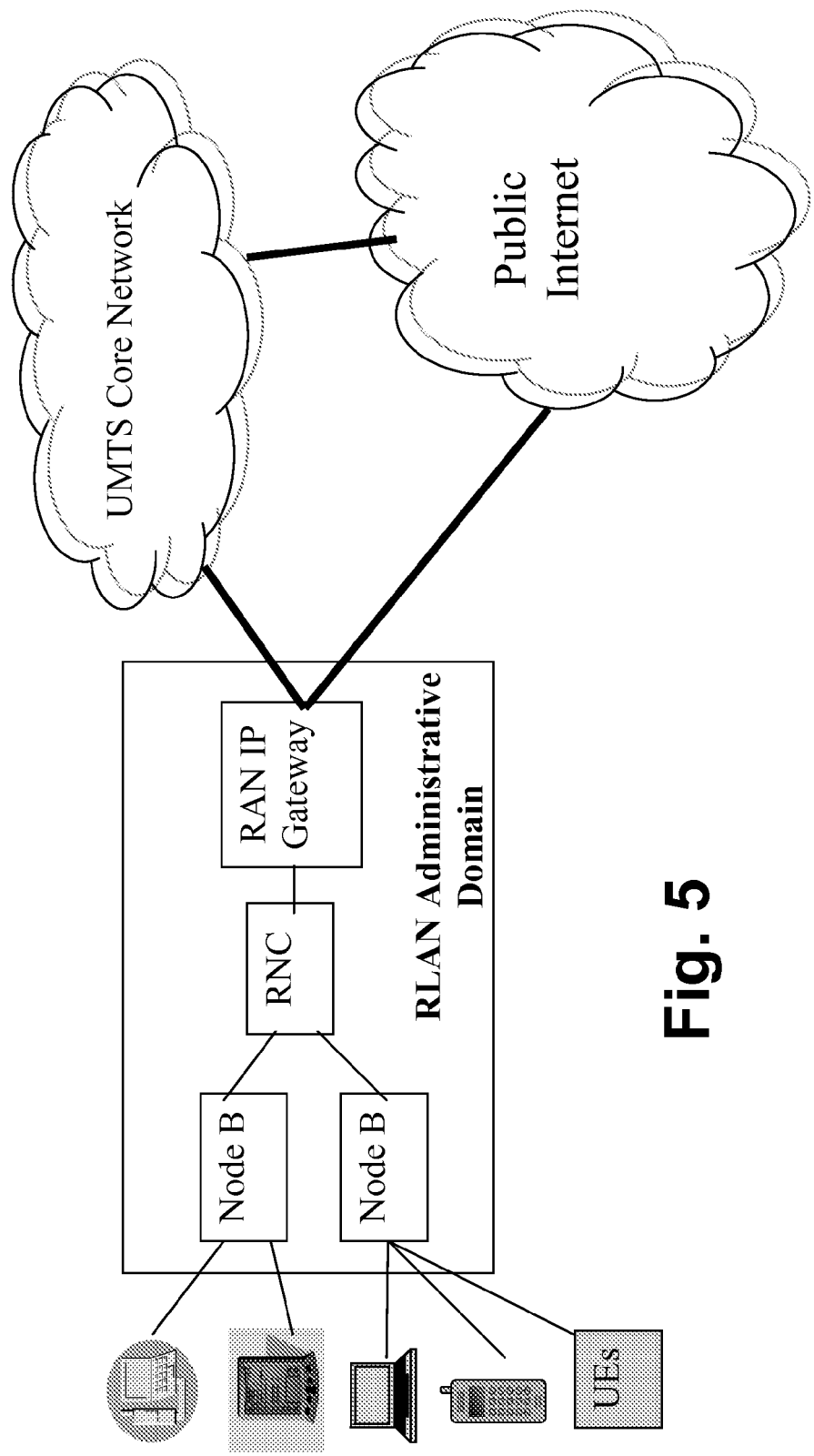
FIG. 5 is a block diagram showing various components of the network shown in FIG. 4.

With reference to FIG. 4, there is shown a modified Universal Mobile Terrestrial System (UMTS) network having a Radio Local Area Network (RLAN) with a direct Internet connection. As shown in FIG. 5, the RLAN employs base stations to communicate via a wireless radio interface with the various types of User Equipments (UEs). Preferably the base stations are of the type specified in 3GPP as node Bs. A radio controller is coupled to the base stations to control the wireless interface. Preferably the radio controller is a Radio Network Controller (RNC) made in accordance with 3GPP specification. Various combinations of Node Bs and RNCs may be employed as used in a conventional 3GPP UTRAN. Collectively, the geographic ranges of the wireless communications conducted with the base stations of the RLAN defines the RLAN's service coverage area.

Figure 6:
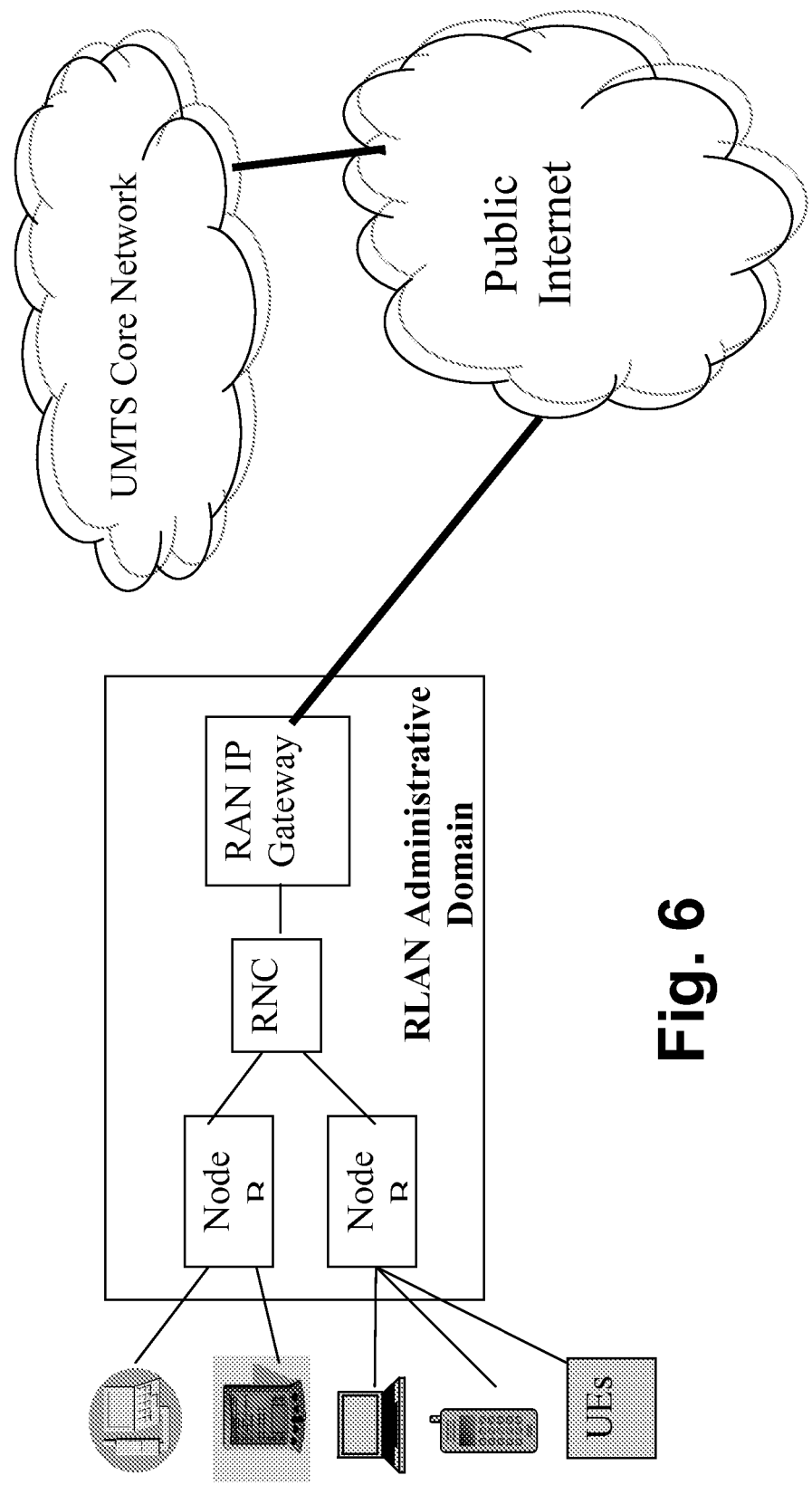
FIG. 6 is a block diagram showing a variation of the network where the RLAN has no direct connection with the UMTS Core Network.
Figure 7:
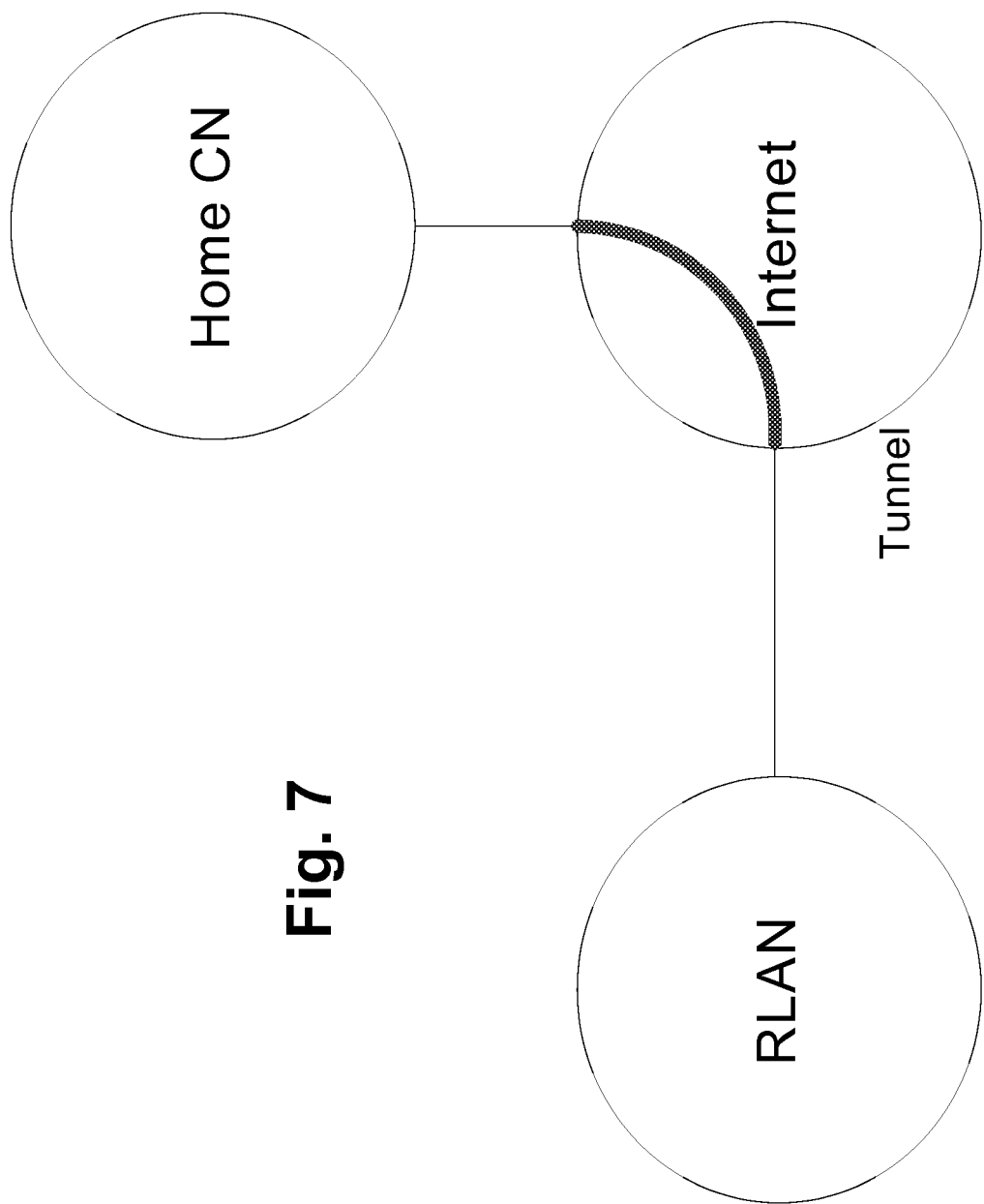
FIG. 7 is a schematic illustration of signaling data flow in the UMTS network illustrated in FIG. 6.

Unlike a conventional UTRAN, the RLAN of the present invention includes a Radio Access Network Internet Protocol (RAN IP) gateway which provides connectivity for the RLAN outside its service coverage area, i.e. the geographic area served by the wireless communication with its base stations. As illustrated in FIGS. 4 and 5, the RAN IP gateway has a direct Internet connection and may have the standard direct UMTS network connection through an Iu interface with an associated Core Network. Alternatively, as illustrated in FIG. 6, the direct interface between an associated Core Network and the RAN IP gateway may be omitted so that the RAN IP Gateway can have only a direct connection with the Internet. In such case, as illustrated in FIG. 7, the RLAN of the present invention may still form a part of a UMTS by the tunneling of control and AAA function information to a Core Network which serves as its Home CN.

Figure 8:
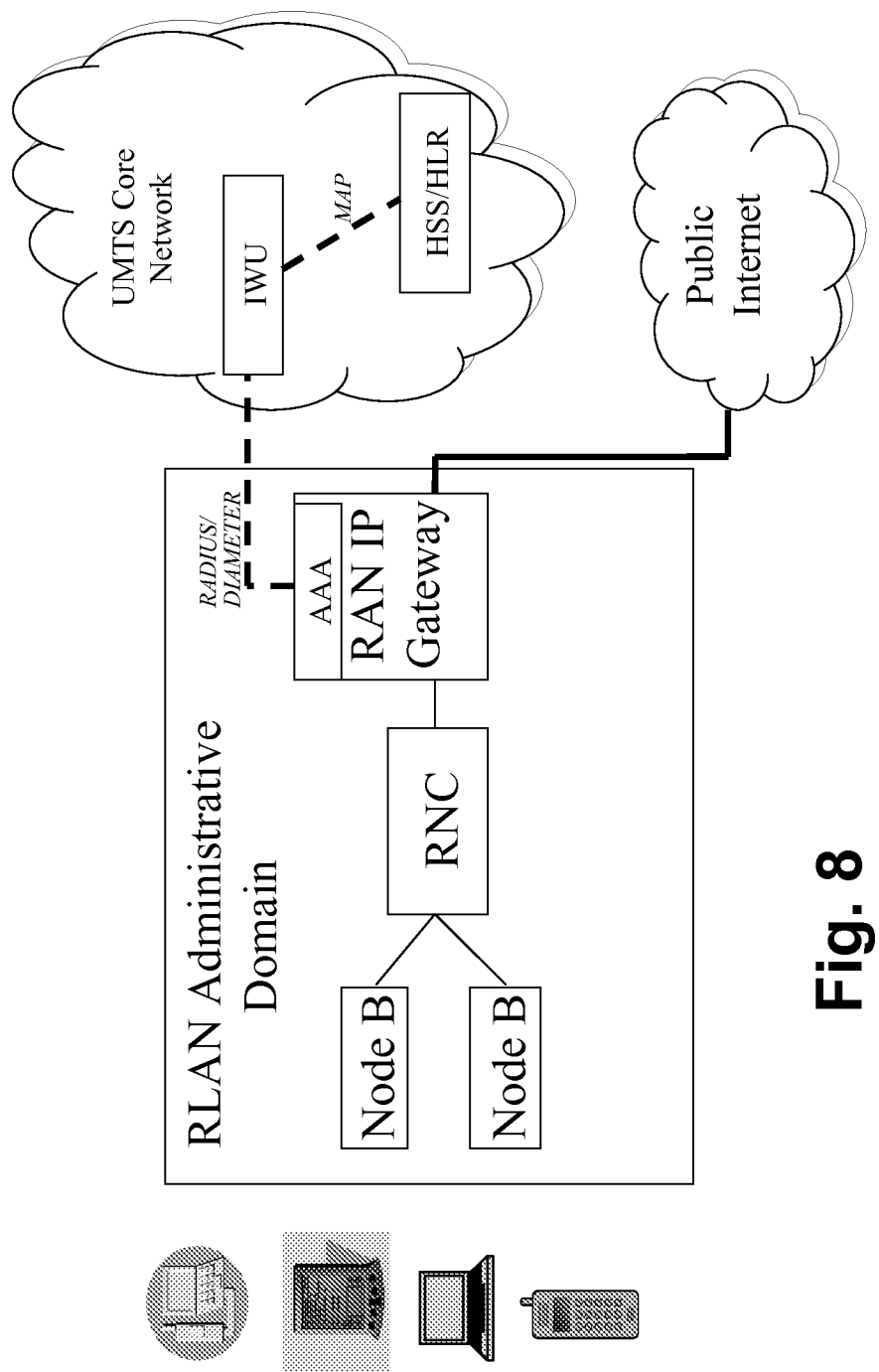
FIG. 8 is a graphic illustration of a second variation of the UMTS network illustrated in FIG. 4 wherein the RLAN has a first type of limited connection with the UMTS Core Network.
Figure 9:
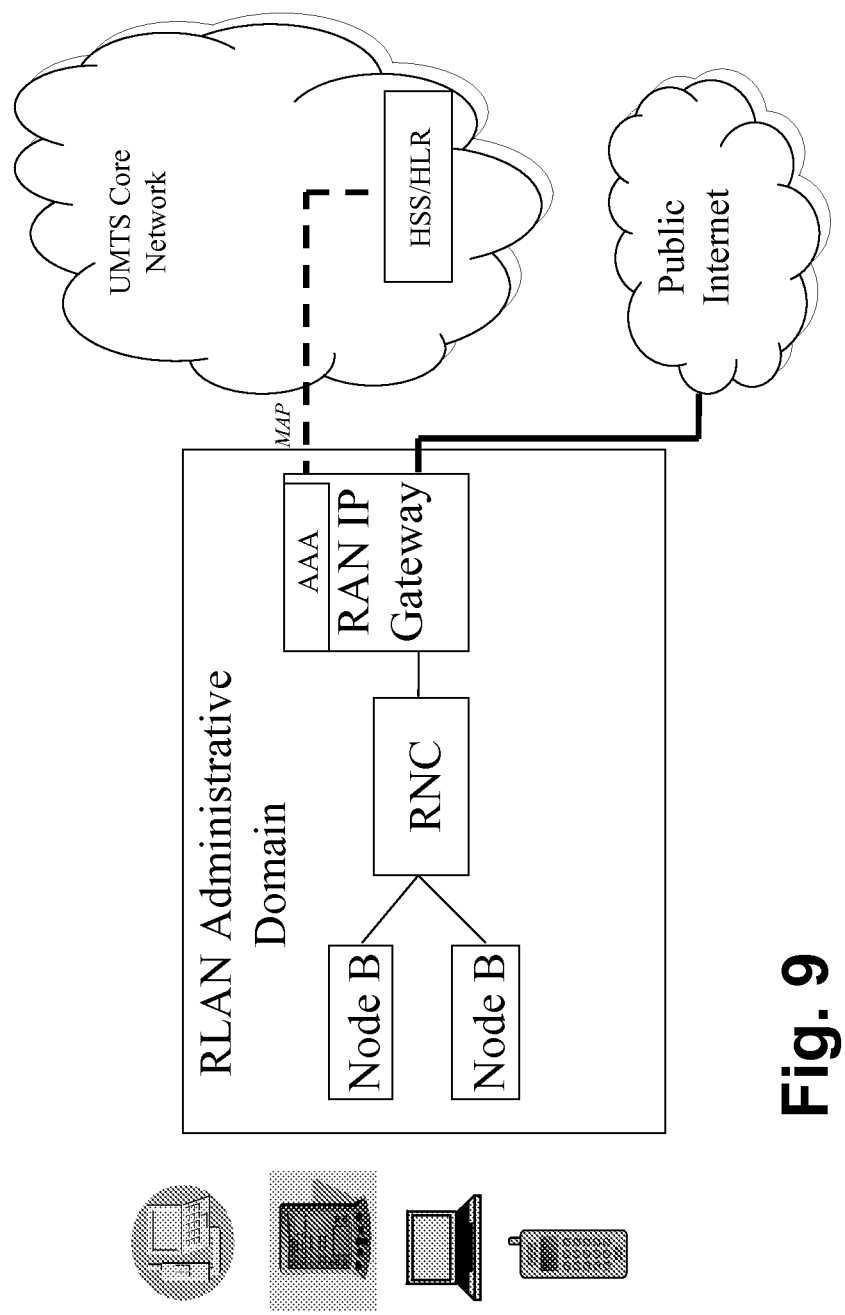
FIG. 9 is a graphic illustration of a second variation of the UMTS network illustrated in FIG. 4 wherein the RLAN has a second type of limited connection with the UMTS Core Network.

FIGS. 8 and 9 illustrate two separate versions of an RLAN made in accordance with the teachings of the present invention wherein the RAN IP Gateway is configured with a control signal port for establishing a limited direct connection with its Home UMTS Core Network. In particular, the limited connectivity transports information needed to provide AAA function support for the CN.

The RAN IP Gateway control signal port may be configured, as illustrated in FIG. 8, to provide control signal data using radius/diameter based access in which case the core network includes an Inter Working Unit (IWU) as specified in 3GPP which converts AAA function information into conventional Mobile Application Part (MAP) signaling for connection with the HSS/HLR of the Core Network. Alternatively, as illustrated in FIG. 9, the RAN IP Gateway control signal port can be configured as a subset of a standard Gr interface which supports MAP signaling which can be directly used by the HSS/HLR of the CN.

Preferably, the RAN IP Gateway employs a standard GI interface with the Internet and can be utilized as a stand-alone system without any association with a Core Network of a UMTS. However, in order to support mobility management with roaming and hand-over services available for subscriber UEs of the RLAN, an AAA function connection with a Core Network, such as by way of the various alternatives illustrated in FIGS. 7, 8 and 9, is desirable. In such case, in addition to a standard GI interface between the RAN IP Gateway of the RLAN and the Internet, a mobile IP protocol is supported. Preferred examples of such mobile IP protocols are the Mobile IP v4 protocol and the Mobile IP v6 protocol as specified by IETF.

Figure 10A:
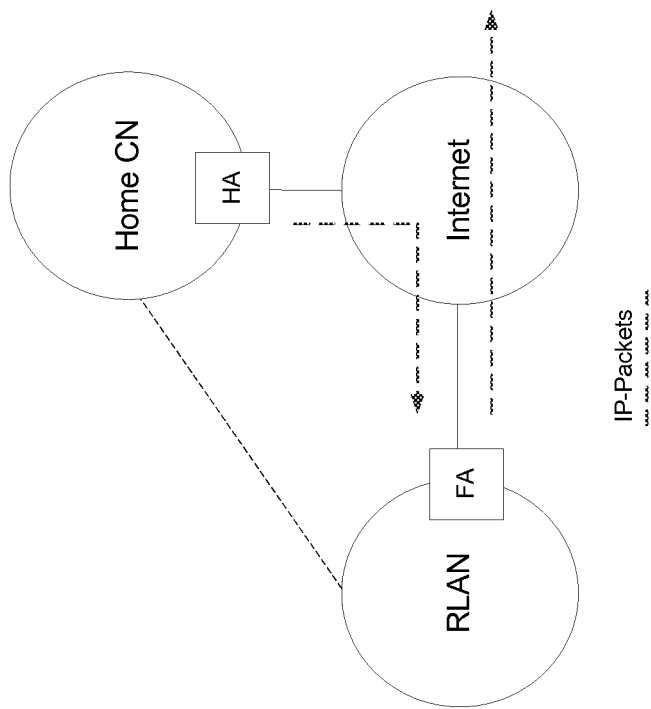
FIGS. 10A and 10B illustrate two variations of IP packet data flow for the networks shown in FIGS. 4, 8 and 9 wherein Mobile IP v4 protocol is implemented by the RLAN.

FIG. 10 illustrates IP packet data flow for a communication between a first UE having a wireless connection with the RLAN and a second UE outside the wireless service region of the RLAN where Mobile IP v4 is implemented on the GI interface between the RAN IP Gateway and the Internet. In such case, user data from the first UE is sent in IP packet format from the RAN IP Gateway of the RLAN through the Internet to the address provided by the second UE. The second UE communications are directed to the Home Address of the first UE which is maintained at the Core Network since in this example the first UE has the CN as its Home CN. The CN receives the IP data packets from the second UE and then the CN forwards the IP packets to the current location of the first UE which is maintained in the CN's HLR as the Forwarding Address (FA) of the first UE.

In this example, since the first UE is "home", the CN tunnels the IP Packets through the Internet to the RAN IP gateway for communication to the first UE. In the case of the first UE traveling outside of the RLAN, its location will be registered with the Core Network and the data packets directed to the address where the first UE is currently located be used by the core network to direct the IP packet data to the current location of the first UE.

Figure 10B:
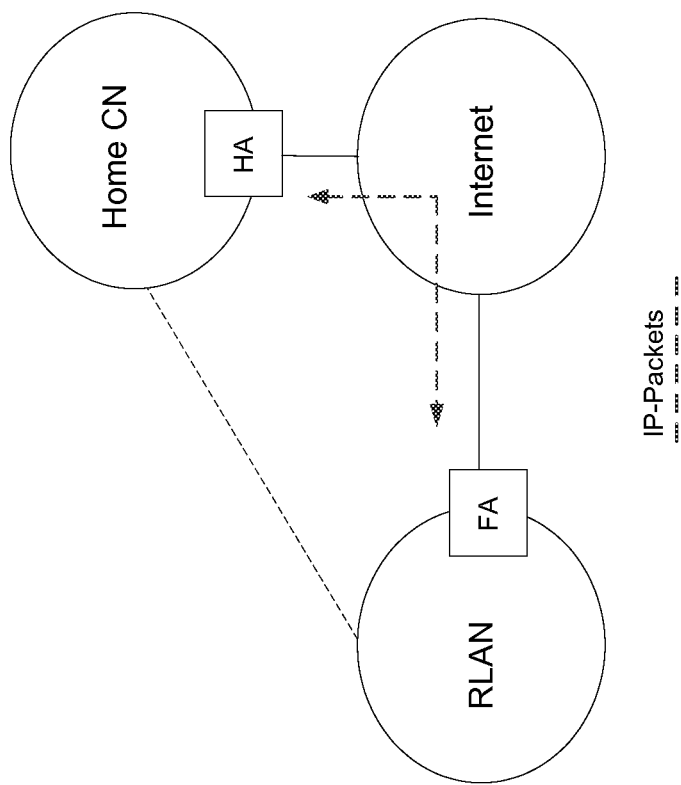

FIG. 10B illustrates an alternate approach where Mobile IP v4 is implemented on the GI interface using with reverse path tunneling such that the RLAN directs the IP packets of the first UE's user data to the Home CN where they are relayed to the second UE in a conventional manner.

Figure 11A:
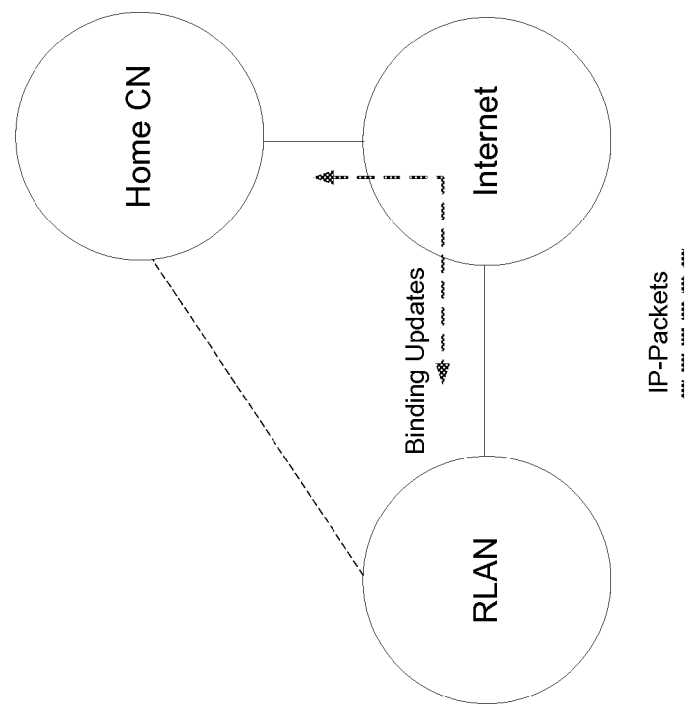
FIGS. 11A and 11B illustrate two variations of IP packet data flow for the networks shown in FIGS. 4, 8 and 9 wherein Mobile IP v6 protocol is implemented by the RLAN.
Figure 11B:
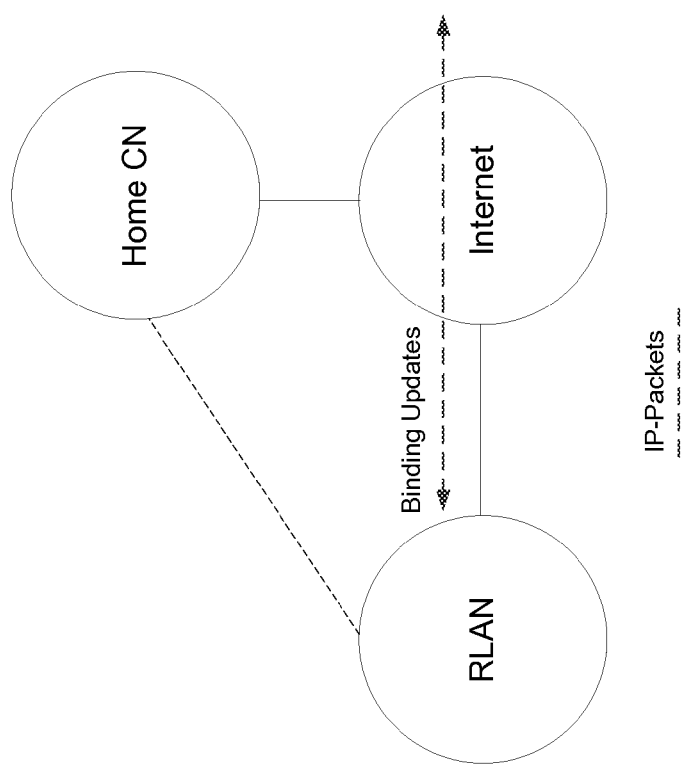

When the RLAN has connectivity using a GI interface that implements Mobile IP v6, the IP packet data exchange between the first UE and the second UE will contain binding updates, as illustrated in FIG. 11A, which will reflect any redirection of the IP packets needed for hand-over. FIG. 11B illustrates an alternative approach using a GI interface implementing mobile IP v6 that includes tunneling between the RLAN and the Home CN. In such case, the CN directly tracks location information of the first UE and the second UE may communicate with the first UE's Home CN in any type of conventional manner.

Figure 12:
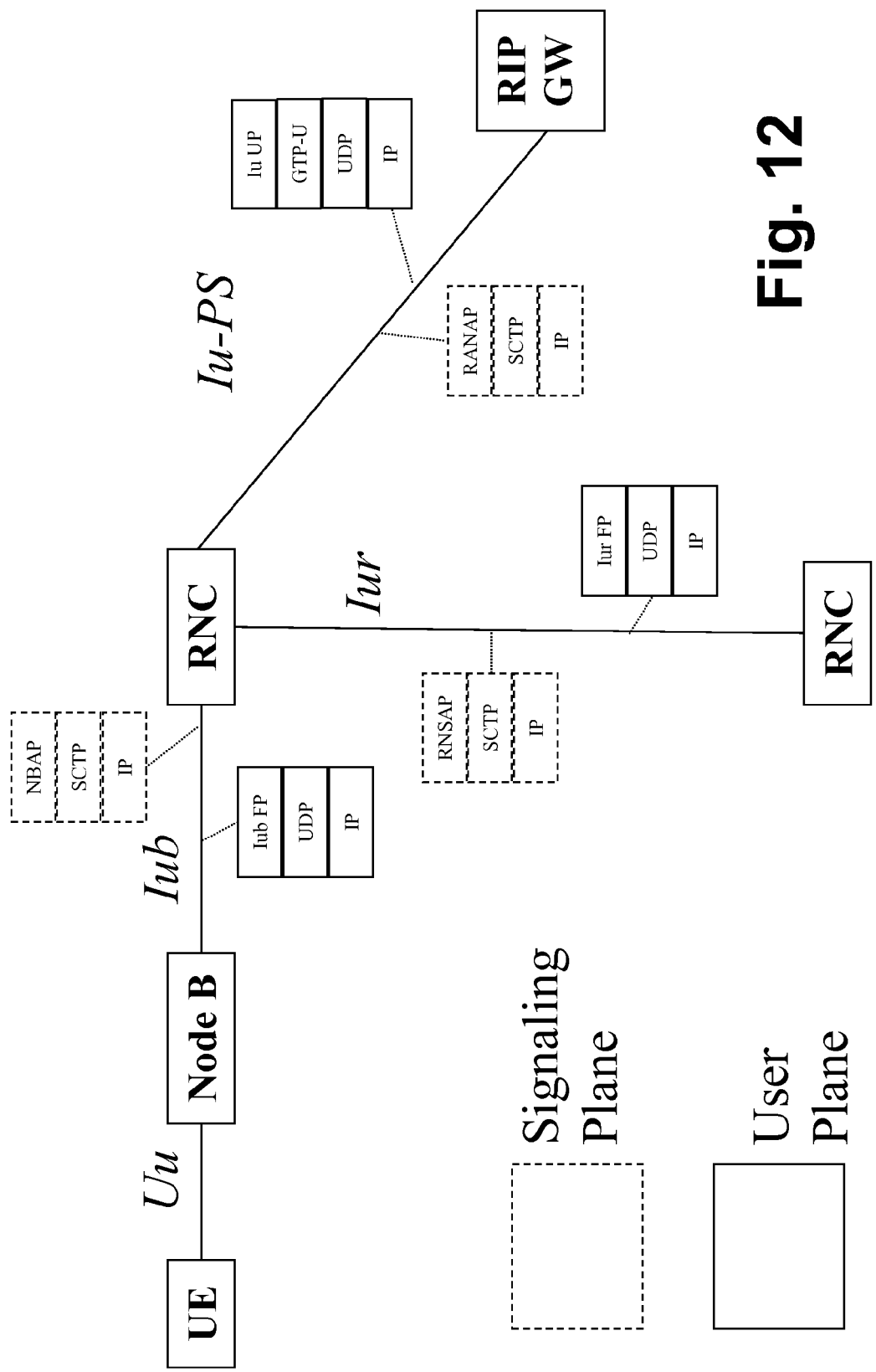
FIG. 12 is a schematic illustration of preferred signaling plane and user plane interfaces within a RLAN made in accordance with the teachings of the present invention.

With reference to FIG. 12, there is shown the construction of preferred interfaces between the components of the RLAN of the present invention. The UE interface between the RLAN via the base station, Node B, is preferably a standard Uu interface for connection with UEs as specified by 3GPP. An Iub interface between each Node B and RNC is preferably implemented both in the control plane and the user data plane as a layered stacked protocol having Internet Protocol (IP) as the transport layer. Similarly at least a subset of an Iu-PS interface is preferably provided between an RNC and the RAN IP Gateway that is a layered stacked protocol having IP as the transport layer.

In a conventional UMTS where SS7 is implemented over ATM, the MTP3/SSCF/SSCOP layers help SCCP, which is the top layer of the SS7 stack, to plug onto an underlying ATM stack. In the preferred IP approach used in conjunction with the present invention, the M3UA/SCTP stack helps SCCP connect onto IP. Essentially, the M3UA/SCTP stack in the preferred IP-based configuration replaces the MTP3/SSCF/SSCOP layers that are used in the conventional SS7-over-ATM approach. The specific details of these standard protocol stack architecture are defined in the IETF (Internet) standards. The use of IP in lieu of ATS enables cost-savings as well as PICO cells for office and campus departments.

Where the RLAN has multiple RNCs, the RNCs can be interfaced via an Iur interface having layered stacked protocols for both the signaling plane and user plane using an IP transport layer. Each RNC is connected to one or more Node Bs which in turn serve in plurality of UEs within respective geographic areas that may overlap to enable intra-RLAN service region handover.

Handover of a UE communication with one Node B within the RLAN to another Node B within the RLAN, intra-RLAN handover, is conducted in the conventional manner specified in 3GPP for intra-UTRAN handover. However, when a UE communicating with a Node B of the RLAN moves outside the RLAN service region, handover is implemented via the RAN IP gateway utilizing IP packet service, preferably, implemented with Mobile IP v4 or Mobile IP v6 as discussed above.

Figure 13:
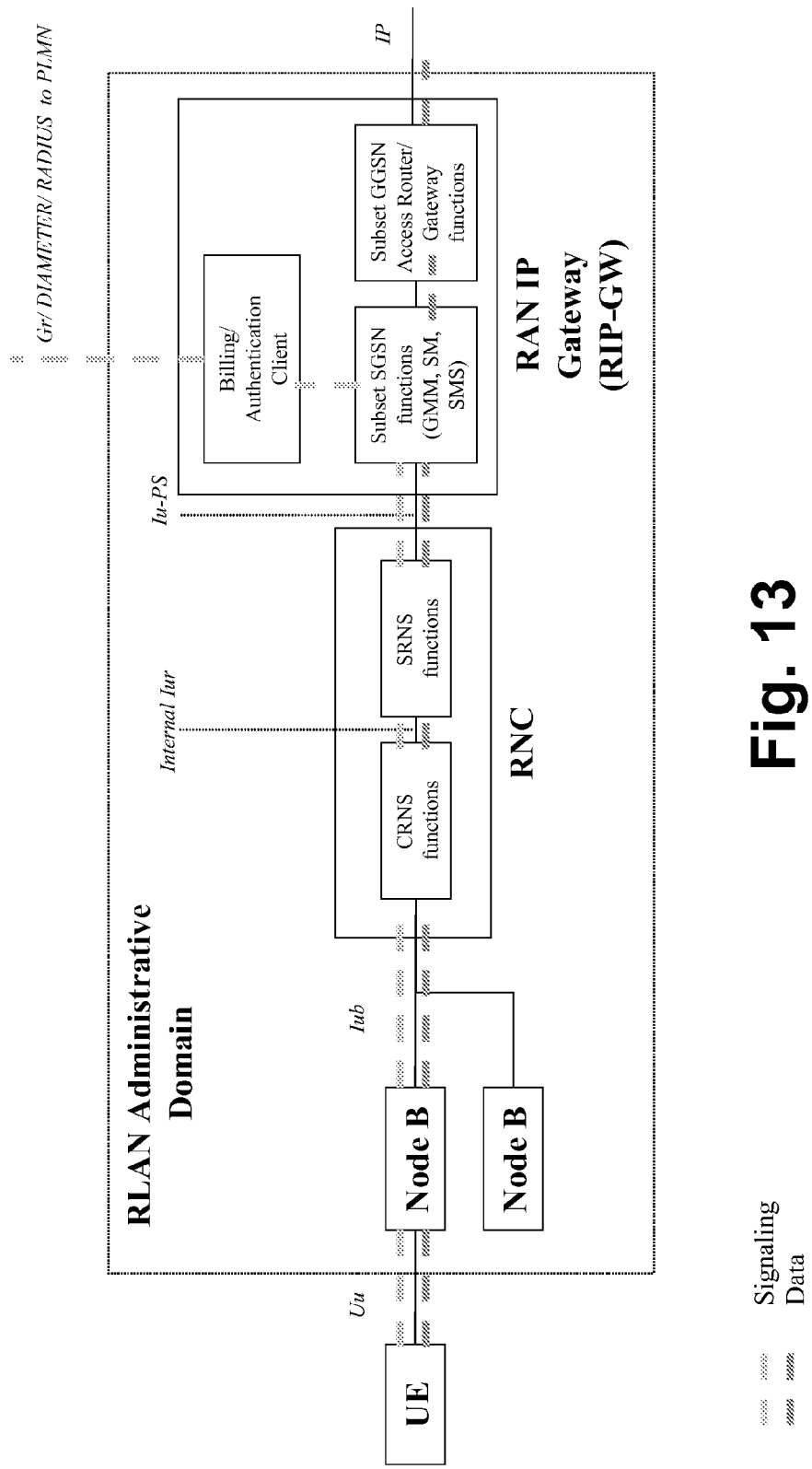
FIG. 13 is a schematic illustration of a RLAN having a single Radio Network Controller in accordance with the teachings of the present invention.
Figure 14:
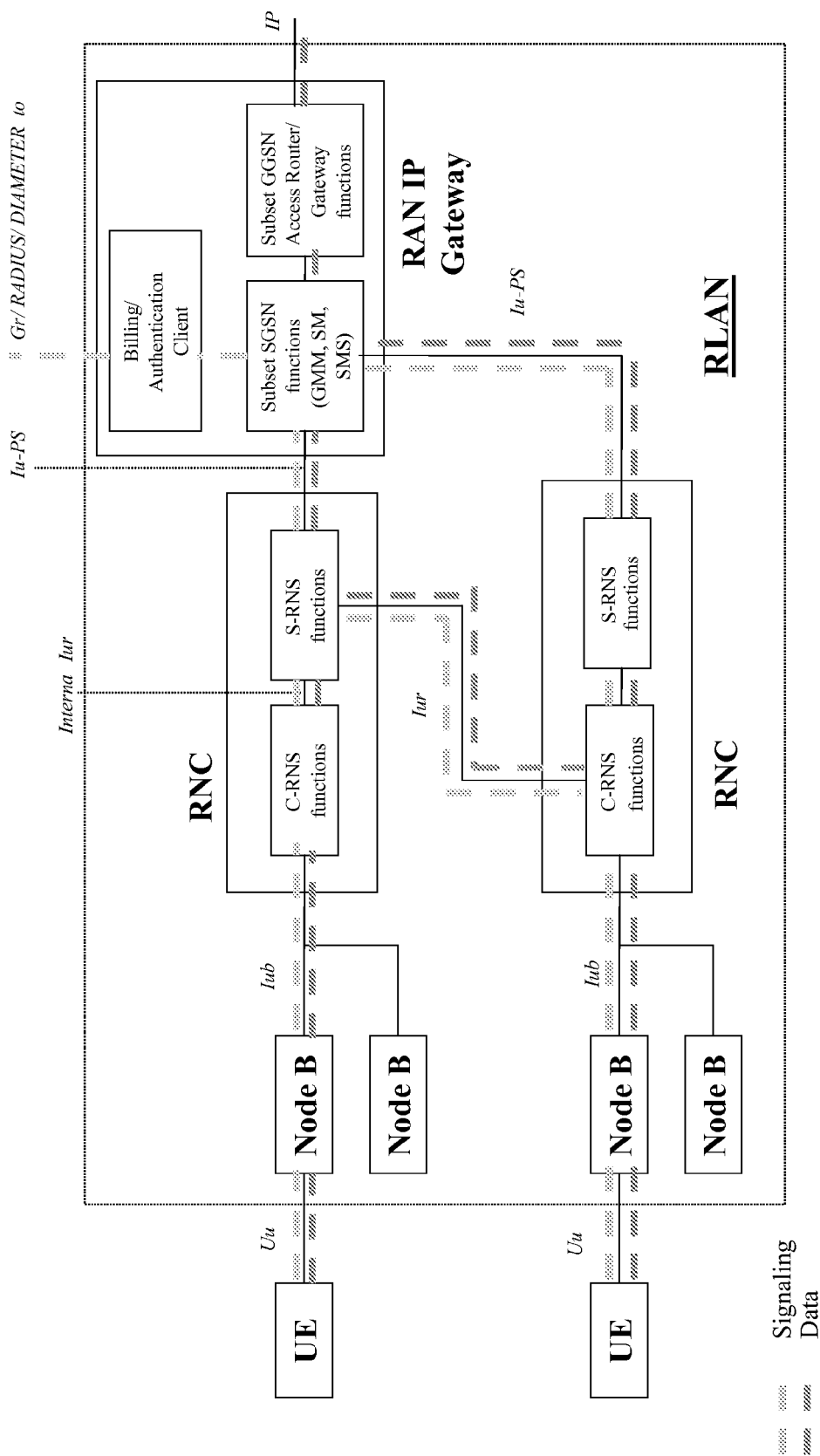
FIG. 14 is a schematic illustration of a RLAN having multiple Radio Network Controllers made in accordance with the teachings of the present invention.

FIG. 13 illustrates the subcomponents of a preferred RLAN in accordance with the present invention. The RNC can be divided into standard Control and Serving Radio Network Subsystems (C-RNSs and S-RNSs) connected by an internal Iur interface. In such a configuration, the S-RNS functions are coupled to a SGSN subcomponent of the RAN IP gateway which supports a subset of the standard SGSN functions, namely, GPRS Mobility Management (GMM), Session Management (SM) and Short Message Service (SMS). The SGSN subcomponent interfaces with a GGSN subcomponent having a subset of a standard GGSN functions including an access router and gateway functions support for the SGNS subcomponent functions and a GI interface with mobile IP for external connectivity to the Internet. The SGSN subcomponent interface with the GGSN subcomponent is preferably via modified Gn/Gp interface, being a subset of the standard Gn/Gp interface for a CN's SGNS and GGSN.

Optionally, the RAN IP Gateway has an AAA function communication subcomponent that is also connected to the SGSN subcomponent and provides a port for limited external connectivity to an associated CN. The port supporting either a Gr interface or a Radius/Diameter interface as discussed above in connection with FIGS. 8 and 9.

Multiple RNCs of the RLAN can be provided coupled with the SGSN subcomponent by an Iu-PS interface which includes sufficient connectivity to support the functions of the SGSN subcomponent. Where multiple RNCs are provided, they are preferably coupled by a standard Iur interface which utilizes an IP transport layer.

Figure 15:
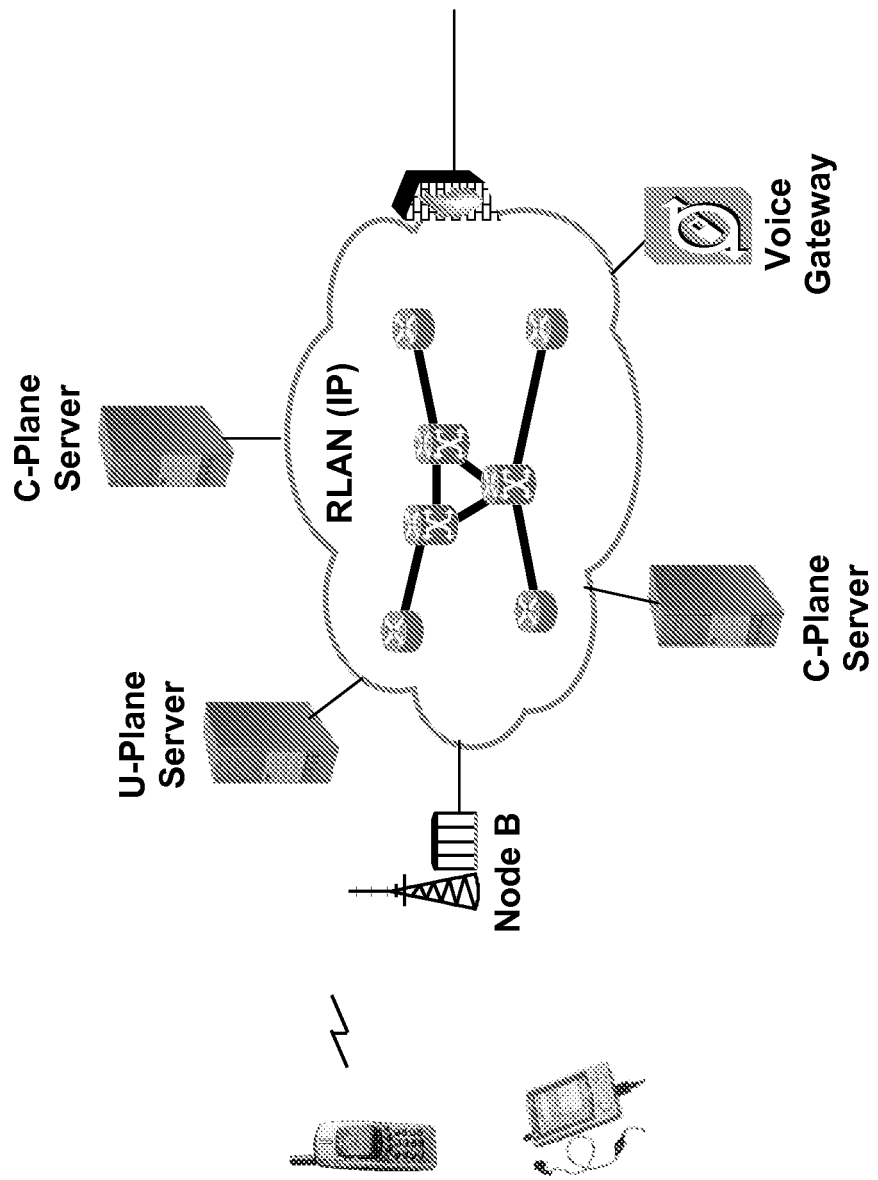
FIG. 15 is an illustrated diagram of an alternate configuration of an RLAN having separate servers for user data and control signals and also an optional voice gateway made in accordance with the teachings of the present invention.
Figure 16:
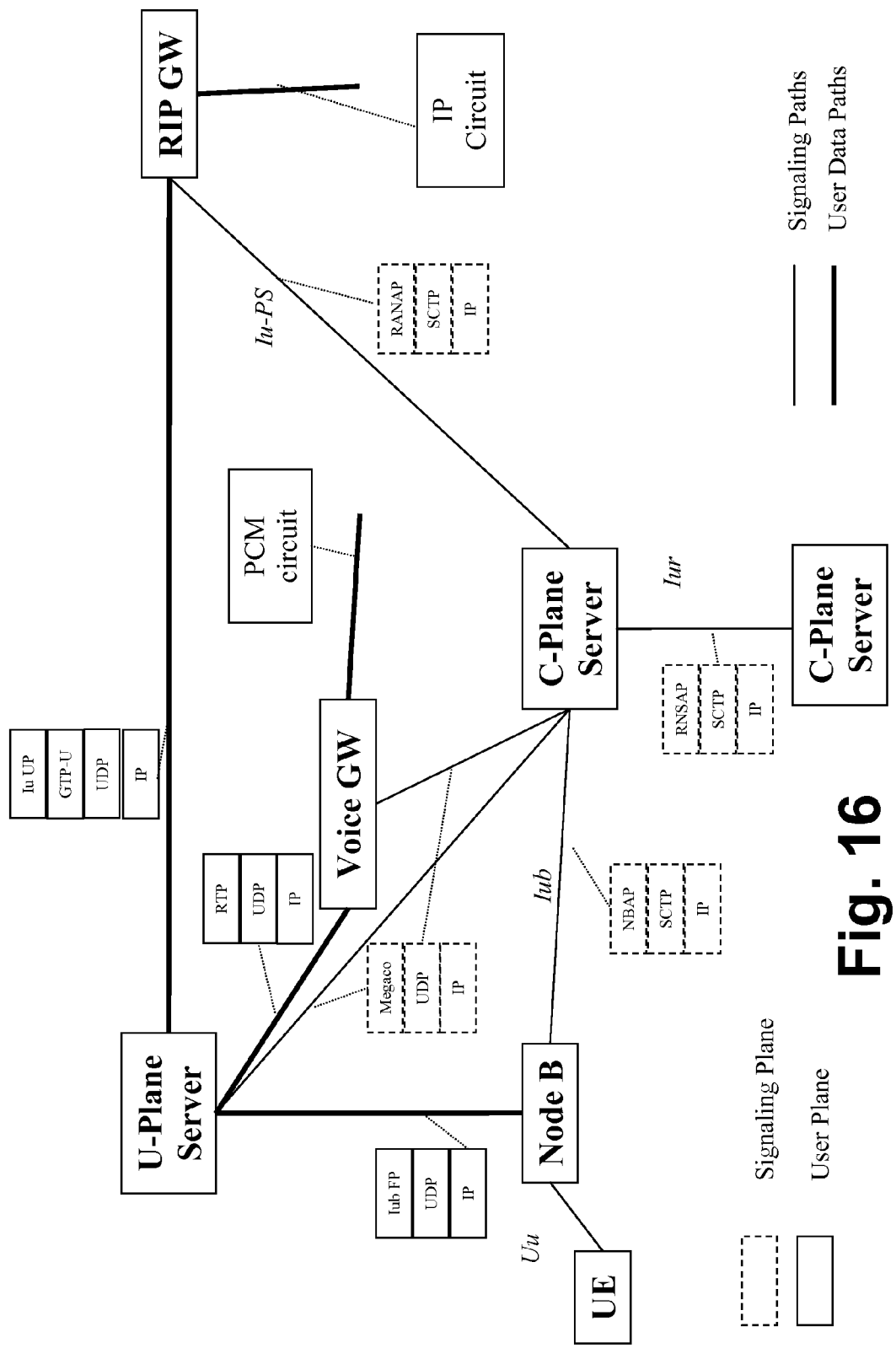
FIG. 16 is a block diagram of components of the RLAN illustrated in FIG. 15.

The use of IP for the transport layer of the various components of the RLAN readily lends itself to implementing the RNC functions in separate computer servers to independently process the user data of communications and the signaling as illustrated in FIG. 15. Referring to FIG. 16, there is a component diagram where the radio control means is divided between U-plane and C-plane servers. In addition to the basic RLAN components, an optional Voice Gateway is also illustrated in FIGS. 15 and 16.

Each Node B of the RLAN has a connection using an IP transport layer with a U-plane server which transports user data. Each Node B of the RLAN also has a separate connection with a C-plane server via a standard Iub signal control interface having an IP transport layer. Both the U-plane server and C-plane server are connected to the IP gateway using layered stacked protocols, preferably having IP as the transport layer.

For multiple C-plane server configurations, each can be coupled to each other via a standard Iur interface, but only one is required to be directly connected to the RIP GW. This allows the sharing of resources for control signal processing which is useful when one area of the RLAN becomes much busier in other areas to spread out the signal processing between C-plane servers. A plurality of C-plane and U-plane servers can be connected in a mesh network for sharing both C-plane and U-plane resources via stacked layer protocols preferably having an IP transport layer.

Where the optional voice gateway having external connectivity via PCM circuit is provided, the U-plane server and C-plane server are coupled to the voice gateway via a stacked layer protocols preferably having an IP transport layer. The C-plane server is then coupled to the U-plane server via a Media gateway control protocol gateway (Megaco) over an IP transport layer. Megaco is a control plane protocol that sets up the bearer connection(s) between a Voice gateway elements, as part of call establishment.

Figure 17:
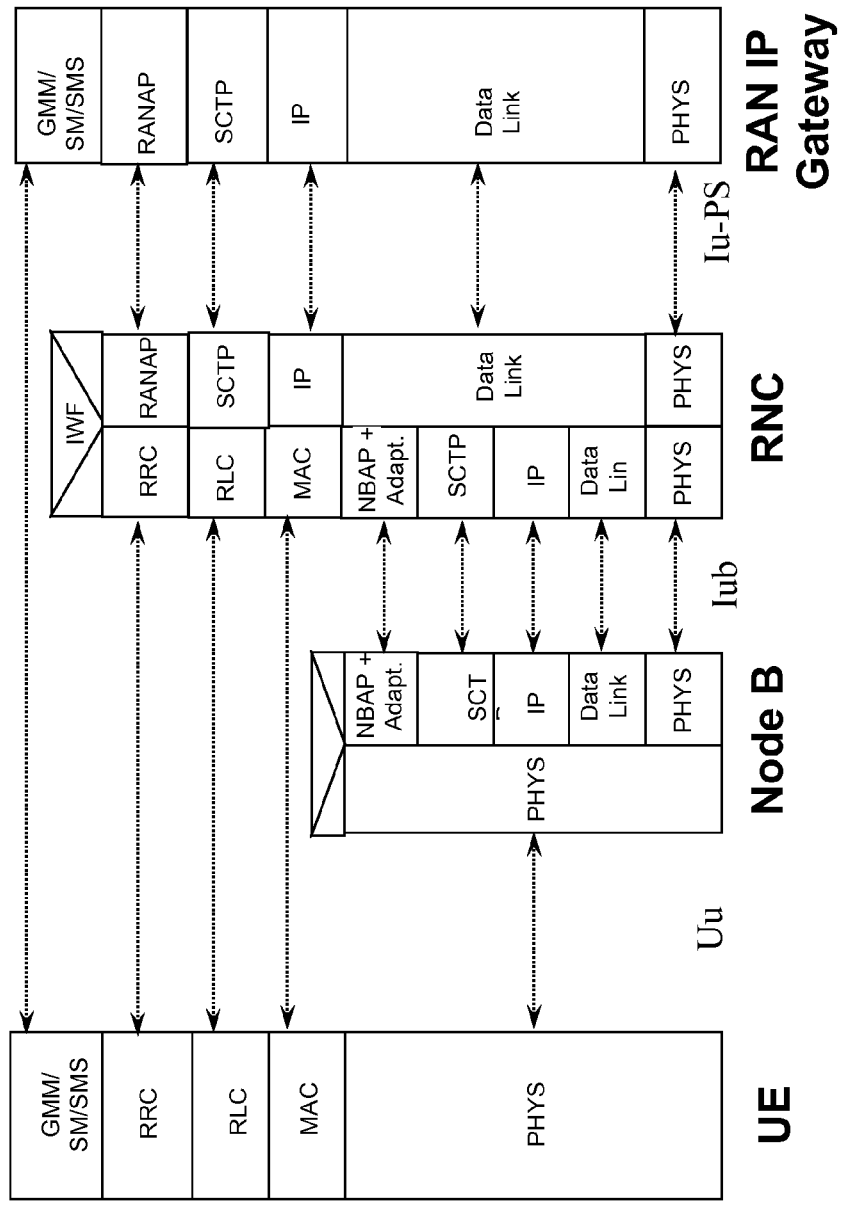
FIG. 17 is a schematic diagram illustrating a preferred protocol stack for the control plane interfaces of a RLAN made in accordance with the teachings of the present invention.
Figure 18:
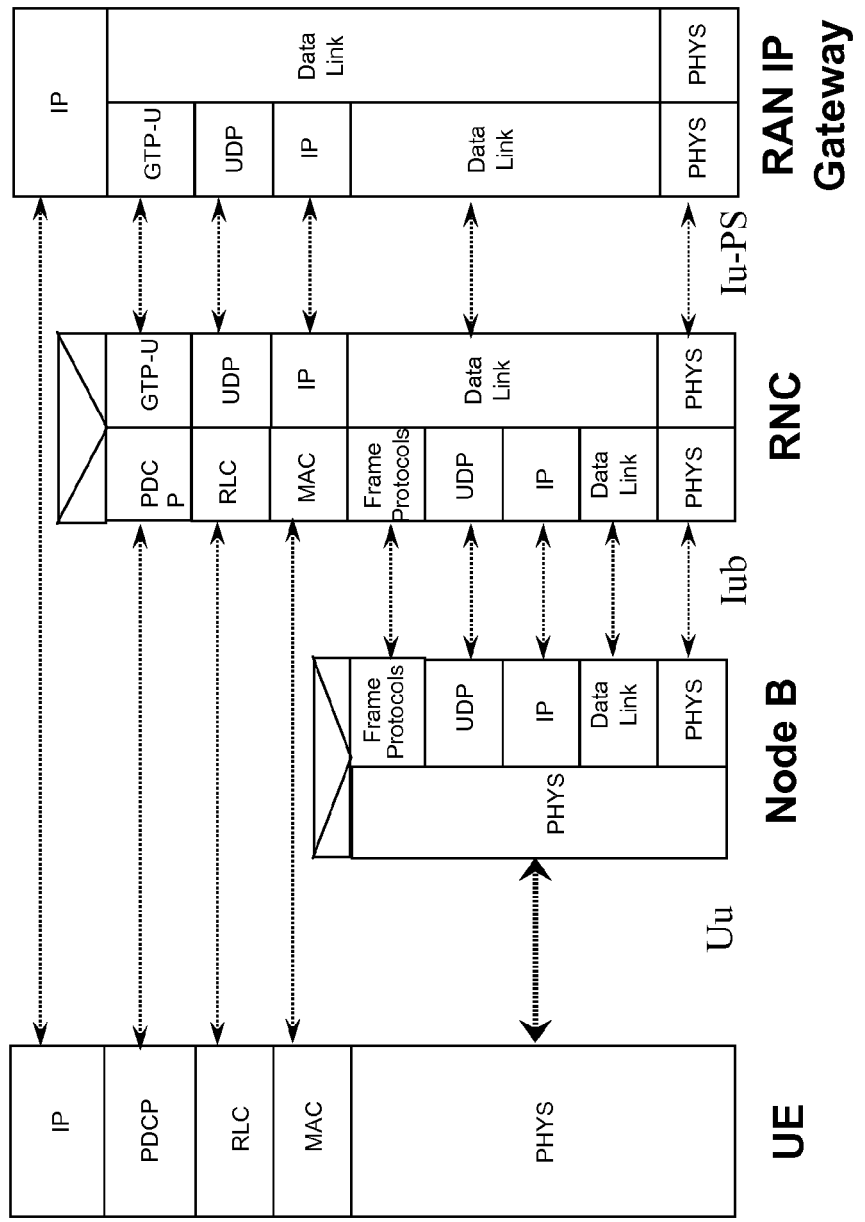
FIG. 18 is a schematic diagram illustrating a preferred protocol stack for the user plane interfaces of a RLAN made in accordance with the teachings of the present invention.

Referring to FIGS. 17 and 18, there are shown, respectively, preferred C-plane and U-plane protocol stacks which are implemented between the Node Bs, RNCs (or U- and C-plane servers) and the RAN IP Gateway of the RLAN. In each drawing, the preferred over air protocol stack implemented via the Uu interface with UEs is also shown.

The RLAN can be configured with voice support over its external IP connection. In such case, the RIP gateway is connected with an Internet Service Provider (ISP) which in turn has a PCM voice gateway. The PCM voice gateway converts voice compression data into a Pulse Code Modulation (PCM) format for external voice communications.

Figure 19:
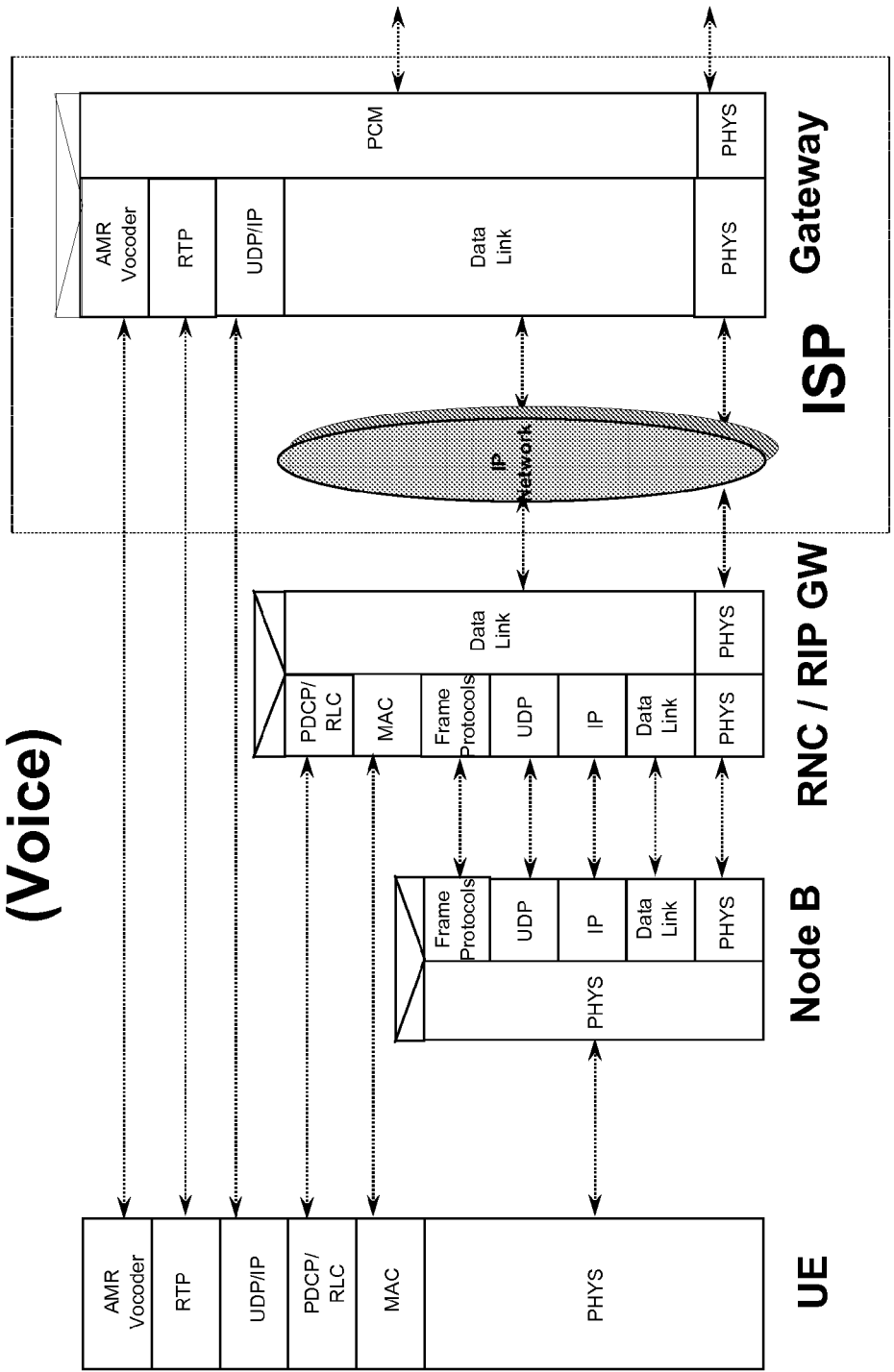
FIGS. 19, 20 and 21 are schematic diagrams illustrating three variations of interface protocol stacks in the user plane for supporting voice communication between a UE having a wireless connection with an RLAN and an ISP connected to the RLAN which has a voice gateway.
Figure 20:
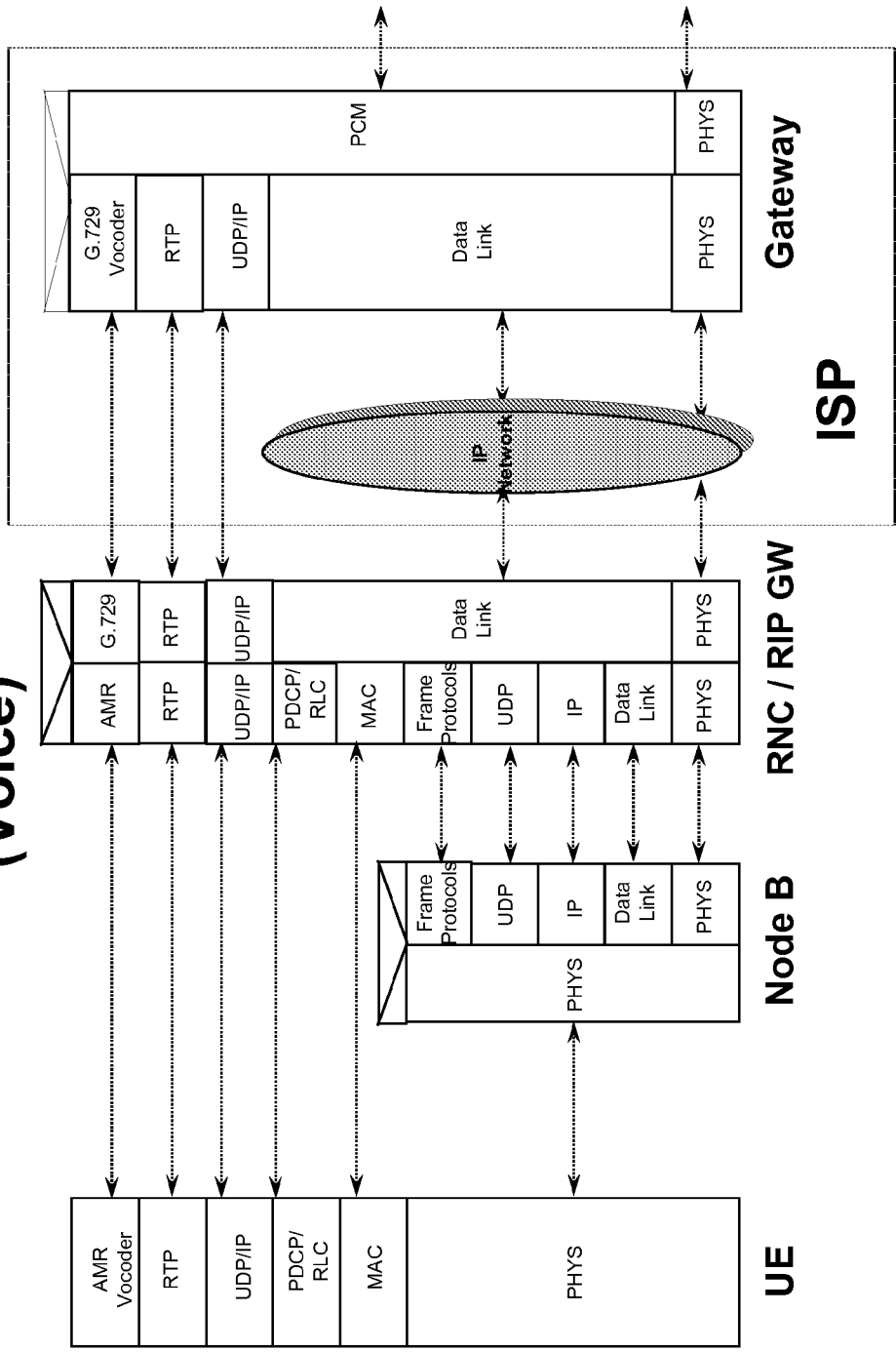
Figure 21:
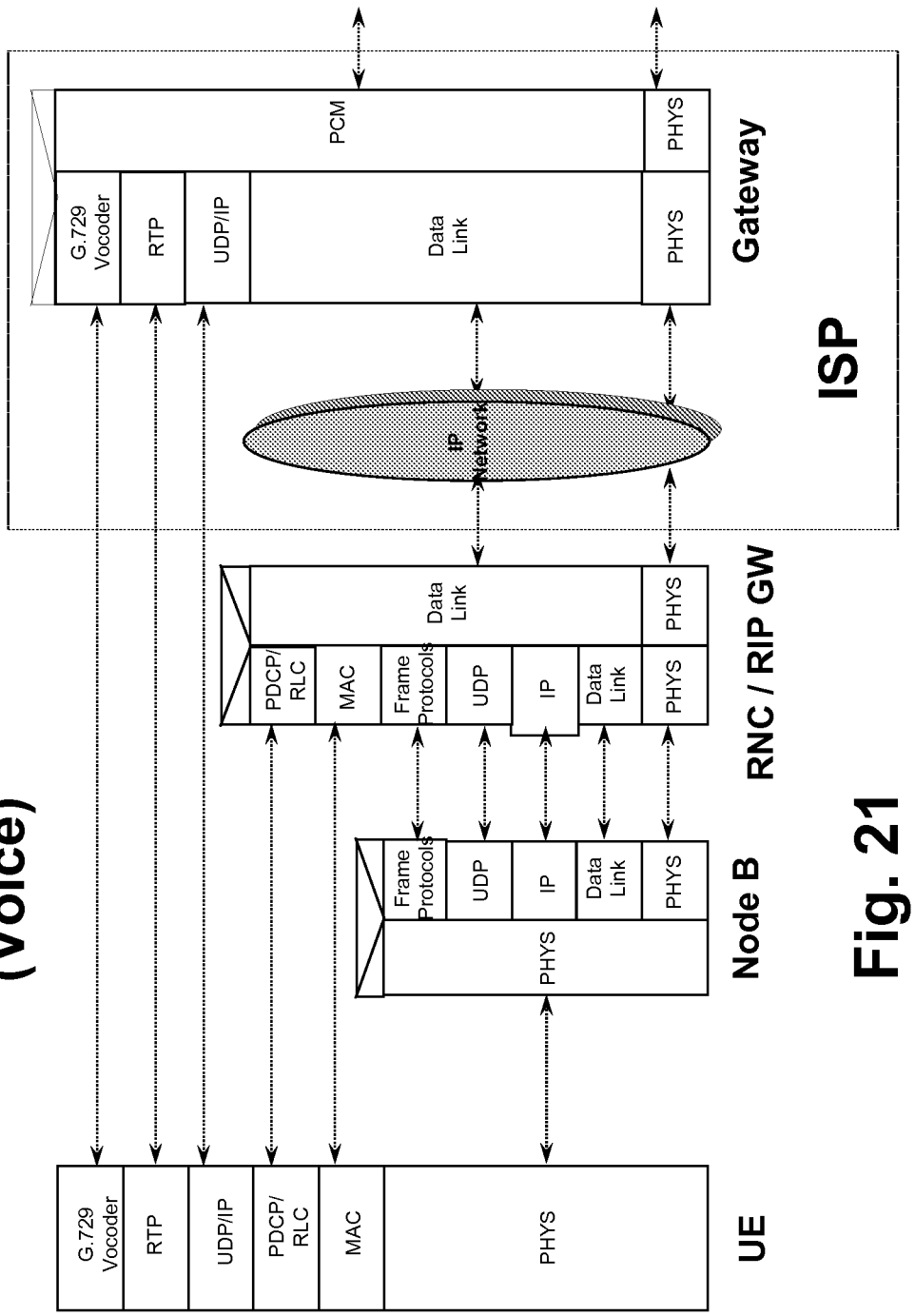

Vocoders are provided that use Coder/Decoders (CODECs) for compression of voice data. Two common types vocoder formats are the AMR vocoder format and G.729 compression format. FIGS. 19 and 21 show preferred U-plane protocol stacks which are implemented where the voice gateway of the ISP to which the RLAN is connected uses the same type of voice compression interface as the UE. AMR vocoder format being illustrated in FIG. 19; G.729 vocoder format being illustrated in FIG. 21. The voice over IP is simply transferred as regular packet data over the IP interface without change.

Where the UE utilizes a different voice compression protocol than the voice gateway of the ISP, a converter is provided in the RNC or the RAN IP Gateway. FIG. 20 shows preferred U-plane protocol stacks, where the UE utilizes an AMR vocoder and the ISP voice gateway utilizes a G.729 vocoder. Preferably, the RAN IP Gateway (RIP GW) includes the AMR/G.729 converter. In the case illustrated in FIG. 20, the converter converts AMR compressed data received from the node B to G.729 format compressed voice format for output by the RIP GW. Where the RLAN utilizes separate U-plane and C-plane servers, the compressed voice data is transported by a U-plane server and the converters may be located in either the U-plane servers or the IP gateway.

Figure 22:
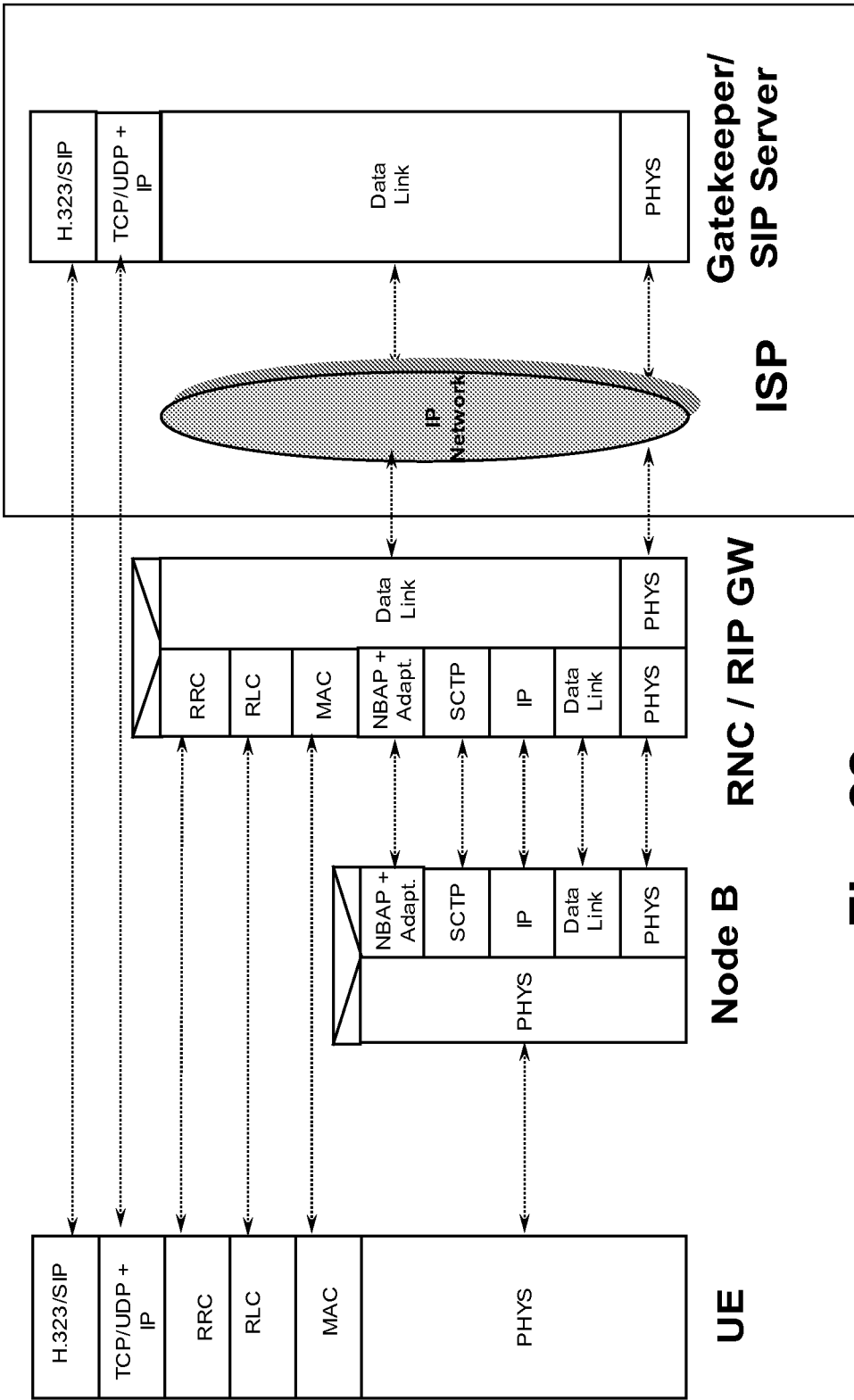
FIG. 22 is a schematic diagram illustrating a variation of interface protocol stacks in the control plane for supporting voice communication between a UE having a wireless connection with an RLAN and an ISP connected to the RLAN which has a voice gateway.

With reference from FIG. 22, there is shown preferred control plane protocol stack architecture for supporting voice using standard H.323 format for a Session Initiated Protocol (H.323/SIP) over TCP/UDP carry by IP. The control signaling is essentially the same irrespective of the type of voice data compression conducted in the U-Place.

Although the present invention has been described based on particular configurations, other variations will be apparent to those of ordinary skill in the art and are within the scope of the present invention.

What is claimed is:

1. A method comprising:
    receiving at a transceiver data in a third generation partnership project (3GPP) wireless format from at least one user equipment (UE);
    routing by an Internet Protocol (IP) gateway the received data in IP formatted packets directly through an Internet interface to bypass a core network; and
    tunneling authentication, authorization, and accounting (AAA) information directly through the Internet interface to the core network.

2. The method of claim 1, wherein the Internet interface is configured with serving general packet radio service (GPRS) support node (SGSN) functions.

3. The method of claim 1, wherein the Internet interface is configured with general packet radio service (GPRS) support node (GGSN) functions.

4. The method of claim 1, further comprising:
    providing picocell coverage.

5. An apparatus comprising:
    a transceiver configured to receive data in a third generation partnership project (3GPP) wireless format from at least one user equipment (UE); and
    an Internet Protocol (IP) gateway configured to route the data in IP formatted packets directly through an Internet interface to bypass a core network, wherein authentication, authorization and accounting (AAA) information is tunneled directly through the Internet interface to the core network.

6. The apparatus of claim 5, wherein the Internet interface is configured with serving general packet radio service (GPRS) support node (SGSN) functions.

7. The apparatus of claim 5, wherein the Internet interface is configured with general packet radio service (GPRS) support node (GGSN) functions.

8. The apparatus of claim 5, wherein the apparatus is further configured to provide picocell coverage.

9. A method comprising:
    receiving data at a transceiver in a third generation partnership project (3GPP) wireless format from at least one user equipment (UE);
    routing from an Internet Protocol (IP) gateway the received data in IP formatted packets through a GI interface such that the data is routed to the Internet by bypassing a core network; and
    tunneling authentication, authorization, and accounting (AAA) information related to the at least one UE through the GI interface and directly to a Home Subscriber Server (HSS).

10. The method as in claim 9, wherein the IP gateway is connected to the Internet via an Internet service provider (ISP).

11. The method as in claim 9, further comprising:
    communicating the AAA information to the core network.

12. An apparatus comprising:
    means for receiving data at a transceiver in a third generation partnership project (3GPP) wireless format from at least one user equipment (UE); and
    means for routing from an Internet Protocol (IP) gateway the received data in IP formatted packets through a GI interface such that the data is routed to the Internet by bypassing a core network; and
    means for tunneling authentication, authorization, and accounting (AAA) information related to the at least one UE through the GI interface and directly to a Home Subscriber Server (HSS).

13. The apparatus as in claim 12, wherein the GI interface includes serving general packet radio service (GPRS) support node (SGSN) functions.

14. The apparatus as in claim 12, further comprising means for communicating the AAA function information to the core network.

* * * * *